United States Patent [19]
Chong et al.

[11] Patent Number: 5,983,278
[45] Date of Patent: *Nov. 9, 1999

[54] LOW-LOSS, FAIR BANDWIDTH ALLOCATION FLOW CONTROL IN A PACKET SWITCH

[75] Inventors: Song Chong, Middletown, N.J.; Mark Katz, Staten Island, N.Y.; David A. Morano, Middletown, N.J.; Ramesh Nagarajan, Aberdeen, N.J.; Walter Michael Pitio, Old Bridge, N.J.; Donald D. Shugard, Middletown, N.J.; Yung-Terng Wang, Marlboro, N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,315

[22] Filed: Apr. 19, 1996

[51] Int. Cl.[6] .................................................. H04Q 11/04
[52] U.S. Cl. ......................... 709/235; 709/234; 709/207; 709/231; 709/233; 370/414; 370/444
[58] Field of Search ........................ 395/200.13, 200.37, 395/200.64, 200.61, 200.62, 200.63, 200.65; 370/229, 235, 414, 444

[56] References Cited

U.S. PATENT DOCUMENTS

| | | | |
|---|---|---|---|
| 4,953,157 | 8/1990 | Franklin et al. | 370/230 |
| 4,970,720 | 11/1990 | Esaki | 370/416 |
| 5,193,090 | 3/1993 | Filipiak et al. | 370/440 |
| 5,345,600 | 9/1994 | Davidson | 455/501 |
| 5,381,413 | 1/1995 | Tobagi et al. | 370/448 |
| 5,434,848 | 7/1995 | Chimento, Jr. et al. | 370/232 |
| 5,546,389 | 8/1996 | Wippenbeck et al. | 370/412 |
| 5,555,264 | 9/1996 | Sallberg et al. | 370/414 |
| 5,619,500 | 4/1997 | Hickali | 370/414 |
| 5,649,299 | 7/1997 | Battin et al. | 455/62 |
| 5,757,801 | 5/1998 | Arimilli | 370/444 |

Primary Examiner—Meng-Ai T. An
Assistant Examiner—Gautam R. Patel
Attorney, Agent, or Firm—Geraldine D. Monteleone; Steven M. Gurey

[57] ABSTRACT

In a switch fabric environment, which includes a buffer, packet data of different class-types from different sources is received, stored in the buffer, processed and outputted to its intended destination. As the buffer fills up, transmission from some of the data sources is stopped to avoid dropping of packets. To avoid packet loss, when the occupancy of the buffer reaches a first threshold value, further transmission of a first-class type of data is precluded from the particular source of that data then being received, while transmission from other sources of that same first-class type of data is not precluded from these other data sources until first-class type of data from such other sources is also received. Further, data of a second-class type is not precluded from being transmitted as long as the amount of data stored in the buffer remains below a second threshold, which is greater than the first threshold. When the occupancy of the buffer reaches that second threshold, further transmissions from the particular source of that second-class type of data then being received is also precluded. As data from other sources of that second-class type of data is received, further transmissions from those other sources are also precluded. A third-class type of data, however, is not precluded from transmission as long as the amount of data remains below a third threshold value, which is greater than the second threshold value. In order to avoid packet loss, when a packet from any source is received, it is stored regardless of whether transmission from the source of that packet has been precluded. Advantageously, a MAX/MIN distribution of the available bandwidth can be probabilistically achieved without packet loss.

11 Claims, 17 Drawing Sheets

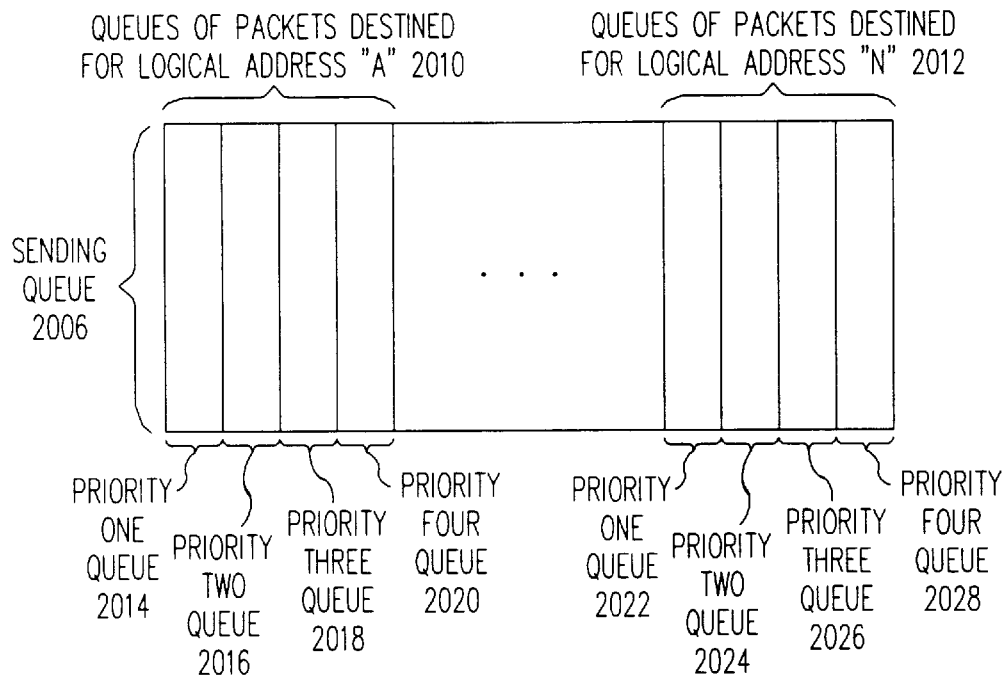
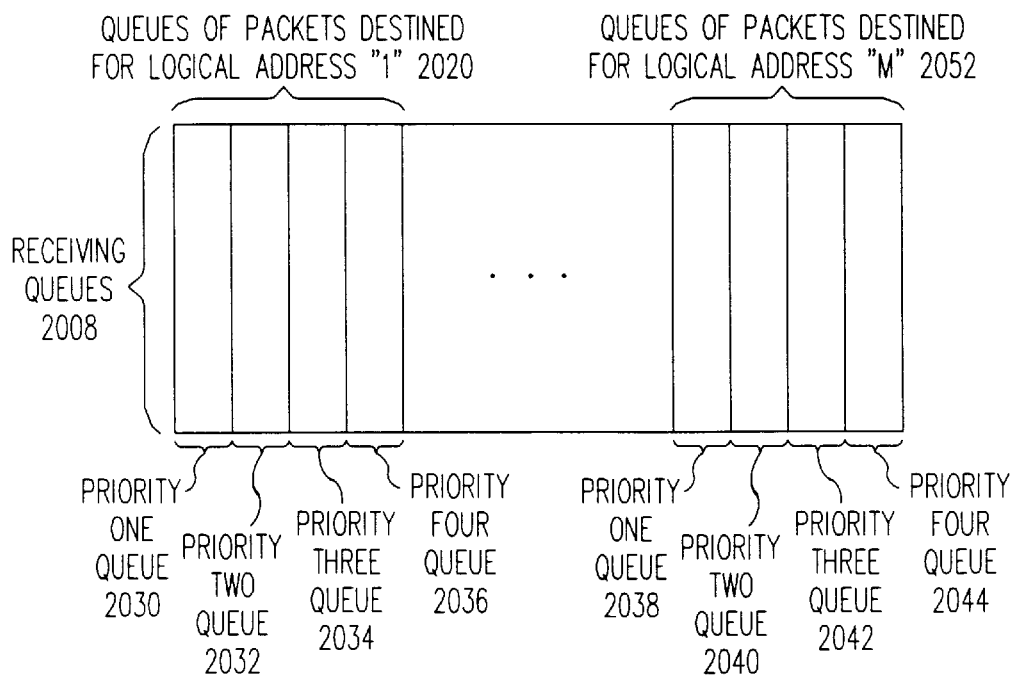

SENDING STAGING QUEUES 3002
IN FIFO STAGING BUFFER 112

RECEIVING STAGING QUEUE 3004
IN HIGH-SPEED FIFO BUFFER 114 FOR
PHYSICAL OR LOGICAL FLOW CONTROL

RECEIVING STAGING QUEUE 3004
IN HIGH-SPEED FIFO BUFFER 114 FOR
HYBRID FLOW CONTROL

LOW-LOSS, FAIR BANDWIDTH ALLOCATION FLOW CONTROL IN A PACKET SWITCH

BACKGROUND OF THE INVENTION

1. Field of the Invention

The invention relates generally to data communications, and more particularly to data switching arrangements.

2. Description of Related Art

Recent years have witnessed a marked increase in traffic volume for wide-area networks (WANs), such as the Internet, as well as for local-area networks (LANs), such as on-premises Ethernet systems. This increase in traffic volume is caused by new technologies, migration from a paradigm of centralized computing to one of distributed computing, and the proliferation of a wide variety of new applications. Also, the rapid pace of technological growth is witnessing an ever-increasing amount of interdisciplinary work in which groups of individuals from diverse technical backgrounds come together to collaborate on a single project. Data networks designed for traditional communities of interest, such as departments, are no longer adequate. The community of interest has now expanded significantly, and, furthermore, the boundaries of the community of interest are no longer static and may, in fact, change from day to day.

Designing a communications network for a large, ever-changing community of interest poses problems that are not adequately addressed by presently-existing data communications systems. In addition to the increased traffic volume of a relatively large network, a bewildering variety of co-existing applications such as telephony, video and computer data networking must often be supported. In general, each of these applications is characterized by a unique set of properties and requirements. The network must therefore be equipped to convey a plurality of applications among various endpoint devices. This challenge has resulted in prior art approaches moving away from more traditional methods of operation, involving routers and bridges, towards more flexible operational modes that utilize on-premises switching arrangements.

Some applications are relatively immune to degradations caused, for example, by data delays and/or losses in the network, whereas others are very vulnerable to these degradations. For instance, if an application is virtually immune to degradation, this may signify that an endpoint device receiving the application data stream will be able to produce humanly intelligible output during the degradation. On the other hand, if the stream is vulnerable to degradation, this means that any degradation will have a relatively significant impact on the output of the endpoint device during the degradation, and that the intelligibility of the output due to this degradation may be quite poor. To complicate matters further, a given stream may be immune to some types of degradation, but very vulnerable to other types of degradation. For example, file transfer applications, and other applications generally known to those skilled in the art as TCP/IP applications, are relatively insensitive to delay, but are relatively vulnerable to data losses.

Existing networks utilize data flow control techniques that do not distinguish between the aforementioned varied application data types. In other words, all data are treated in the same manner, irrespective of the effect that a data stream degradation will have on that data type, and irrespective of the effect that such a degradation will have on the quality of service perceived by an endpoint device user. Prior art flow control methods provide no effective mechanism for advantageously exploiting the unique properties of each of these diverse data types.

One mechanism for exploiting the unique characteristics of a plurality of data types is to define one or more data priority levels. Data priority can be defined with reference to quality of service considerations, which considers the effect that data delay and/or loss will have on the intelligibility of the output as perceived by a typical endpoint device user. If high-priority data are delayed and/or lost, the effect on intelligibility is relatively great, whereas if low-priority data are delayed and/or lost, the effect on intelligibility is relatively insignificant. For example, consider a network that is equipped to switch ATM (asynchronous transfer mode) data. In ATM, five classes of data service have been defined, including CBR (constant bit rate) data, real-time VBR (variable bit rate) data, non-real-time VBR data, ABR (available bit rate) data, and UBR (unspecified bit rate) data. CBR data is relatively sensitive to delays and losses, meaning that such delays and/or losses degrade the quality of service to a relatively significant degree, whereas UBR data are relatively insensitive to delays and/or losses, and the quality of service is undegraded relative to CBR data. Therefore, CBR data packets may be conceptualized as high-priority data traffic, and the UBR data packets as low-priority data traffic.

In general, multipriority data traffic is traffic that includes representations of different types of data as, for example, CBR data, VBR data, ABR data, and UBR data. This data traffic is typically organized into data packets. With respect to switching delays and losses, prior art communications networks do not distinguish one type of data from another. What is needed is some mechanism for distinguishing high-priority data packets from low-priority data packets for purposes of data flow control.

Flow control techniques operate in the environment of data switching devices. As an example, consider the switch architecture shown in FIG. 1. A switch fabric 102 is provided in the form of a dual-bus architecture having a transmit bus 104 and a receive bus 106. The dual-bus architecture of FIG. 1 is shown for illustrative purposes only, as other types of switch fabric architectures do not employ dual busses, and still other types of switch fabric architectures do not employ any busses. Although the techniques disclosed herein are described in the context of a dual-bus architecture, this is for illustrative purposes only, it being understood that these techniques are also applicable in the operational environments of other types of switch architectures including, for example, a shared memory architecture.

The transmit bus 104 and the receive bus 106 are adapted for connection to one or more port cards 108, 109, 113. The port cards 108, 109, 113 transmit on transmit bus 104 and receive from receive bus 106. Receive bus 106 is separate from transmit bus 104, but the transmit bus 104 is looped back onto the receive bus 106 through a loop-back circuit 111 located at an end of the transmit bus 104 and an end of the receive bus 106. These port cards are typically equipped to handle a wide variety of interfaces such as ATM (Asynchronous Transfer Mode) interfaces, LAN (local area network) interfaces such as Ethernet, and TDM (time division multiplexed) circuit interfaces. The architecture set forth in FIG. 1 is often employed to provide access hubs and/or backbone hubs in the operational environments of campuses, private networks, and corporate networks.

Access to the transmit bus 104 may be achieved through the use of a technique commonly known as a multipriority round-robin discipline, and this technique is performed among active port cards 108, 109, 113. Port cards 108, 109, 113 interface to the receive bus 106 and to the transmit bus 104 bus via a high-speed integrated circuit referred to as the bus interface chip (BIC) 110. The BIC 110 includes a first high-speed first-in, first-out (FIFO) staging buffer 112 for transmission on the transmit bus 104, a second high-speed FIFO buffer 114 for receipt from the receive bus 106, and a processor 115. Port cards 108, 109, 113 each include slow-speed memory 116, which may be provided in the form of random-access memory (RAM), and which could be, but is generally not, integrated into BIC 110. Slow-speed memory 116 serves as the primary buffering area to and from the actual physical communications ports of the BIC 110. One function of the FIFO staging buffer 112 is to serve as a staging area for data sent from a port card to the transmit bus 104, and one function of the high-speed FIFO buffer 114 is as a rate converter (from the bus transmission rate to the communications port transmission rate) for data received from the receive bus 106. Due to the large potential difference in data transfer rates between the receive bus 106 and a port card (e.g., port card 108), FIFO buffer 114 may overflow. Therefore, what is needed is a data flow control technique that adequately compensates for any disparities in data transfer rates out of the port cards 108, 109, 113 on the one hand, and into the port cards from the receive bus 106 on the other, while respecting data priorities and the unique characteristics of applications mapped to these priorities.

SUMMARY OF THE INVENTION

Methods are disclosed for use in conjunction with a data communications system having a switch fabric and one or more port cards. Each port card has, or is coupled to, a buffer. The buffer is integrated into, or adapted for coupling to, the switch fabric. These methods control the flow of multipriority data to and from the port cards. Multipriority data refers to the existence of more than one type of data, wherein each type of data is assigned a priority ranking relative to other types of data. The priority ranking may be based upon quality-of-service considerations associated with that data type, and the data may be organized into packets. If these packets are of a fixed size, then the packet transfer rate of a bit stream is indicative of the bit transfer rate of this stream. The methods of data flow control disclosed herein operate in conjunction with a first type of data having a first priority and a second type of data having a second priority lower than the first priority. The first type of data includes one or more first-priority bit streams, and the second type of data includes one or more second-priority bit streams.

A first method of multipriority data flow control, termed logical flow control, operates as follows. The occupancy of a buffer on a port card is monitored. If the occupancy exceeds a second threshold greater than a first threshold, the bit transfer rates of the second-priority bit streams destined for a given port card are compared. If fixed-size packets are utilized, the packet transfer rate is proportional to the bit transfer rate, so the packet transfer rates of bit streams may be compared instead of comparing actual bit transfer rates. Transmission of the second-priority bit stream having the highest bit transfer rate, or a group of second-priority bit streams having the highest bit transfer rates, to the port card is disabled until the buffer occupancy drops below the first threshold. Once the buffer occupancy drops below the first threshold, transmission of the second-priority bit rate stream (or streams) having the highest bit transfer rate (or rates) to the port card is enabled.

If the buffer occupancy exceeds a fourth threshold greater than a third threshold, the bit transfer rates of the first-priority data streams destined for a given port card are compared. As stated above, if fixed-size packets are utilized, the packet transfer rate is proportional to the bit transfer rate, so the packet transfer rates of bit streams may be compared instead of comparing actual bit transfer rates. Transmission of the first-priority bit stream having the highest bit transfer rate, or a group of first-priority bit streams having the highest bit transfer rates, to the port card is disabled until the buffer occupancy drops below the third threshold. Once the buffer occupancy drops below the third threshold, transmission of the first-priority bit rate stream or streams having the highest bit transfer rate (rates) to the port card is enabled. In this manner, high-bit-transfer-rate streams are controlled first, and, if lower-packet-transfer-rate streams are controlled at all, such streams are controlled after the higher-bit-transfer-rate streams have already been subjected to control. Therefore, higher-bit-transfer-rate streams will not prevent receipt of lower-bit-transfer-rate streams.

A second method of multipriority data flow control, termed physical flow control, operates as follows. The occupancy of a buffer on a port card is monitored. If the occupancy exceeds a second threshold greater than a first threshold, transmission of all second-priority bit streams to the port card is disabled until the buffer occupancy drops below the first threshold. Once the buffer occupancy drops below the first threshold, transmission of all second-priority bit streams to the port card is enabled. If the buffer occupancy exceeds a fourth threshold greater than a third threshold, transmission of all first-priority bit streams to the port card is disabled until the buffer occupancy drops below the third threshold. Once the buffer occupancy drops below the third threshold, transmission of all first-priority bit streams to the port card is enabled.

A third method of multipriority data flow control, termed hybrid flow control, is a combination of the first and second flow control methods. First, logical flow control is performed. The buffer occupancy of the port card buffer is monitored and, once the occupancy exceeds a fifth threshold greater than the fourth threshold, logical flow control ceases and physical flow control is performed, such that the transmission of all bit streams to the port card is disabled. Transmission of first-priority bit streams to the port card is enabled when the buffer occupancy drops below the third threshold, and transmission of second-priority bit streams to the port card is enabled when the buffer occupancy drops below the first threshold.

In the context of the above flow control methods, further methods are disclosed for comparing packet transfer rates to select a bit stream, or a group of bit streams, to which flow control will be applied. According to one further method disclosed herein, this selection is performed by examining the sequence of packet arrivals corresponding to each of the bit streams, and controlling the bit stream or bit streams in the order of the packet arrivals, because bit streams with higher transfer rates appear earlier in the sequence. Methods are also disclosed for disabling flow control by means of the port card sending a "dummy" packet to itself.

BRIEF DESCRIPTION OF THE DRAWINGS

FIGS. 3A and 3B are data structure diagrams setting forth illustrative organizational topologies for the slow-speed memory of FIG. 1.

DETAILED DESCRIPTION OF THE PREFERRED EMBODIMENTS

Figure 1:
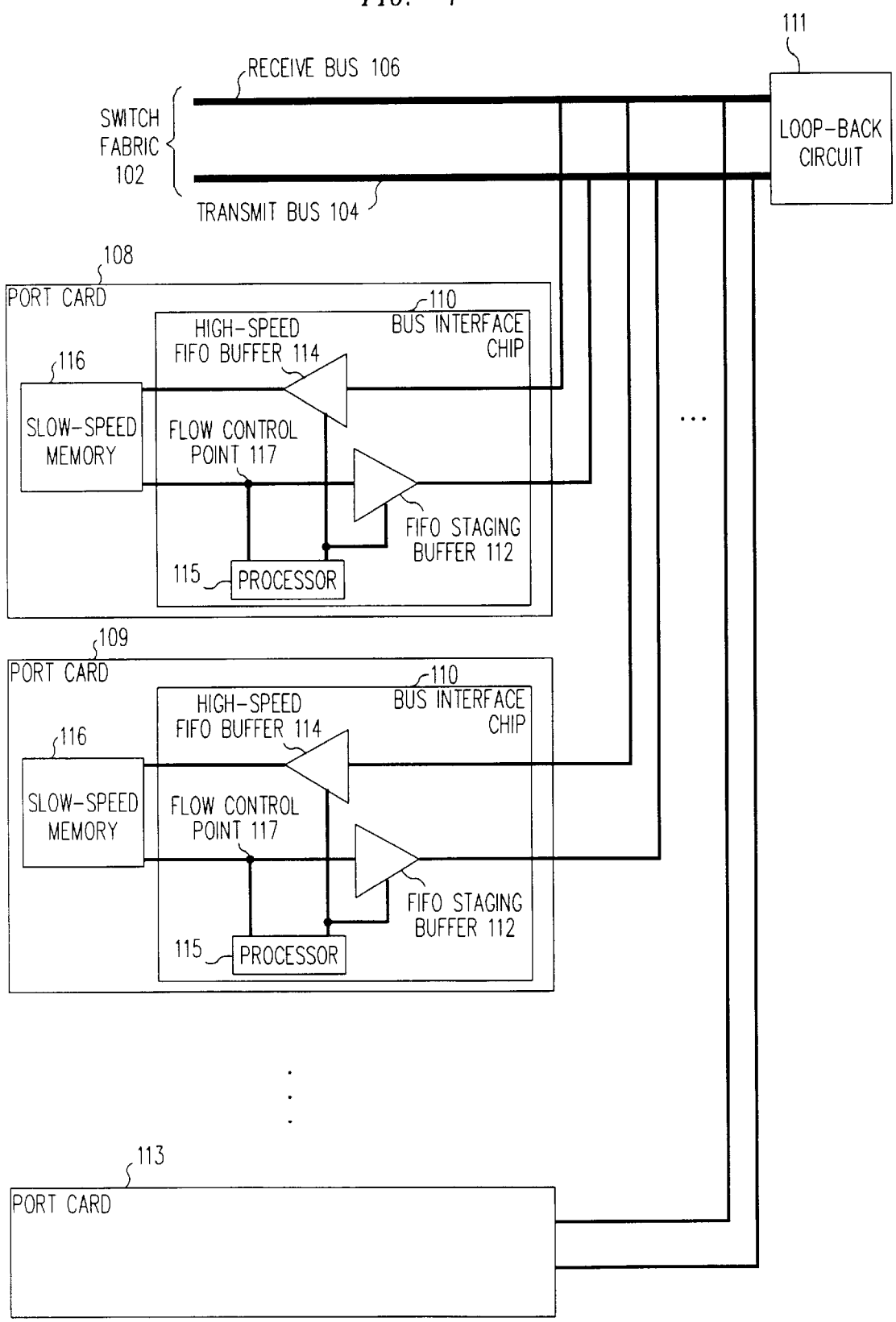
FIG. 1 is a hardware block diagram showing the operational environment of data flow control techniques.

The methods of the invention disclosed herein operate in conjunction with data switching mechanisms that utilize some type of switch fabric. An illustrative switch fabric 102, described above in conjunction with FIG. 1, uses a dual-bus structural topology. Although the methods of the invention as described below will be set forth in the context of a switch fabric 102 that employs dual busses, this is for purposes of illustration only. The switch fabric 102 may, for example, utilize a greater or lesser number of busses than two, or may utilize an architecture without any busses. The adaptation of the flow control techniques described herein to other switching fabrics is a matter within the knowledge of those skilled in the art.

Referring again to FIG. 1, flow control mechanisms limit the queueing of data on the receive side of the bus interface chip (BIC) 110 by shifting this queueing to the large slow-speed memory 116 on the sending port card (e.g., port card 109). The routing of data on the switch fabric (i.e., on the receive bus 106 and the transmit bus 104) is based upon a logical addressing scheme. An address is assigned to each logical egress point of a port card 108. These logical egress points may represent either the port card itself (i.e., port card 108), any logically-definable portion of a port card 108, and/or an ATM address (VPI/VCI). These ATM addresses are described, for example, in a reference entitled, "ATM Networks: Concepts, Protocols, Applications", by R. Handel, M. N. Huber, and S. Schroeder, published by Addison-Wesley, in 1994. In the case where a logical address is defined to correspond to a given port card 108, this address is also referred to as a physical address. The logical (physical) address is typically placed into a data structure termed a "local envelope header". On the receive side, the BIC 110 uses this address to filter envelopes destined to the port card (i.e., port card 108) of the respective BIC 110.

Several objectives must be considered when designing a flow control mechanism for use in the operational environment of multipriority data switching. One objective of flow control is to prevent data loss at high-speed FIFO buffer 114 of BIC 110, and another objective of flow control is to minimize the required size of high-speed FIFO buffer 114 and FIFO staging buffer 112. If data are lost, retransmissions are required in order to recover from this loss, and, in so doing, to provide a lossless switch fabric 102. However, these retransmissions of data decrease the efficiency and the overall switching capacity of switch fabric 102. Data retransmissions also introduce excessive delays into the transfer of data from one port card to another, and mandate the use of complicated mechanisms at the sending and receiving port cards.

Another objective of flow control is to maintain data throughput Persistent, nonselective application of flow control to a given data stream, which may be conceptualized as throttling this data stream, can result in severe backlogs at the port card 108 that is sending the data stream. In order to clear these backlogs, large amounts of bus capacity and/or a relatively wide data channel bandwidth between the slow-speed memory 116 and the BIC 110 must be provided during time periods when no flow control is being applied. The bandwidth required between BIC 110 and the slow-speed memory 116 may be well in excess of the average bandwidth of the data stream and, moreover, may even exceed the maximum available bandwidth. When this excess bandwidth is not available, data throughput falls below the theoretical maximum capacity that the system is equipped to provide.

A further goal of flow control is to achieve a certain delay priority among different priority classes in a switch fabric. Given that the use of a flow control scheme prevents data loss in a switching fabric, other performance criteria for ascertaining the effectiveness of flow control include measurements of switching delay and jitter. A reasonable objective for delay-priority in a switch fabric is to not control (and, hence, to not delay) high-priority streams unless these streams are responsible for buffer congestion at the receiving port card. Low-priority streams, on the other hand, should be controlled, irrespective of their responsibility for causing buffer congestion, if any of the higher-priority streams are being controlled. In this manner, higher-priority streams are effectively isolated from lower-priority streams, because any of these lower-priority streams have the potential for causing congestion. Moreover, the flow of high-priority data streams is kept intact, at least to the extent that the receiving buffer has capacity available to receive this high-priority stream. Such a delay priority scheme is useful in the context of ATM (asynchronous transfer mode) service categories as defined, for example, in a document entitled, "ATM Forum Traffic Management Specification, Version 4.0", February 1996. To this end, flow control schemes should be designed to convey high-priority CBR (constant bit rate) ATM data traffic with a minimum amount of jitter and delay, even during periods of buffer congestion, as long as low-priority ABR (available bit rate) traffic is responsible for causing such buffer congestion.

The aforementioned objectives of flow control techniques primarily address the issue of bandwidth allocation among a plurality of data priorities. However, another factor to consider in the context of flow control techniques is fairness in bandwidth allocation amongst a plurality of data streams of a given priority level. This consideration is important where no knowledge of the specific characteristics and requirements of a stream, such as quality-of-service (QOS) requirements, is available. Even if specific characteristics and/or requirements of a bit stream are known, it would nevertheless be difficult to incorporate such characteristics and/or requirements into a flow control technique, because, as a general principle, flow control techniques should be simple and fast. Processing QOS information to provide flow control would be too inefficient, complex, and time-consuming. In view of the foregoing considerations, one commonly-utilized bandwidth allocation technique is known as MAX-MIN bandwidth allocation, and this technique may be utilized in conjunction with any of the flow control methods disclosed herein to allocate bandwidth to data streams within a given priority class.

MAX-MIN bandwidth allocation examines the transfer rates of data streams that are destined for bottlenecked resources, such as a port card 109 having a high-speed FIFO buffer 114 with a high occupancy. In circumstances where such a "bottleneck" does not exist, the FIFO buffer 114 of port card 109 will receive data substantially as soon as the data are transmitted on receive bus 106 and arrive at port card 109. Consequently, the port card 109 is said to receive data at the "injected rate", i.e., the rate at which data are being injected into the BIC 110 of port card 109.

Assume that the high-speed FIFO buffer 114 of port card 109 is receiving data from receive bus 106 faster than the data can be conveyed to slow-speed memory 116. Note that FIFO buffer 114 will, in this example, eventually become fully-occupied unless the data transfer rate of the data on receive bus 106 is reduced, i.e., unless flow control is applied. Pursuant to MIN/MAX bandwidth allocation, once port card 109 is no longer able to receive a data stream at the injected rate, then no other data stream on switch fabric 102 that is also being received at less than its injected rate will simultaneously be able to receive a greater share of bandwidth than the stream destined for port card 109.

Bandwidth allocation fairness is of concern only when a resource, such as port card 109, is overloaded. If the system is engineered to limit the duration of such an overload, MAX-MIN fairness may be viewed as a means to temporarily penalize data streams having relatively high transfer rates, while at the same time allowing relatively lower-rate streams through to the destination port card(s). This is in contrast to other schemes, such as rate-proportional bandwidth allocation, where a higher-rate bit stream is allowed to completely block a lower-rate bit stream.

When activated, flow control mechanisms should provide relatively short (or, ideally, no) data transfer delays. Since one objective of flow control is to shift data queueing from the receive side of a first, receiving BIC 110 to the transmit side of a second, transmitting BIC 110, i.e., from the high-speed FIFO buffer 114 of receiving port card 108 to the slow-speed memory 116 of transmitting port card 109, flow control must necessarily sacrifice a certain amount of delay efficiency so as to compensate for data losses. Since a typical switch fabric 102 provides an extremely high data transfer rate relative to the data rates of individual bit streams destined for port cards 108, 109, 113, such a tradeoff will provide inherent advantages.

Other objectives of flow control are to minimize the amount of bus 104, 106 bandwidth that must be used for control purposes, to minimize the amount of control buffer space required for high-speed FIFO buffer 114, and to minimize the complexity of the data processing and control signaling steps that must be performed at BIC 110. In particular, when in-band control signaling is performed, control messages must then compete with ordinary data for bandwidth resources and, in some circumstances, these control signals can starve data streams of bandwidth. Finally, the flow control scheme should be simple enough to implement at the BIC 110, and should operate at high data transfer rates approaching the maximum achievable data transfer rate of the switch fabric 102.

The various embodiments of multipriority data flow control methods disclosed herein are useful, for example, in the context of a data switching system that utilizes the following operational framework. However, note that this operational framework is discussed for illustrative purposes only, and the flow control method disclosed herein are also applicable to data switching systems that use other types of operational frameworks. In an illustrative data switching system, data flow from a transmitting resource, such as sending port card 109, may be selectively activated and deactivated, and such flow control is referred to as ON/OFF flow control. When flow control is activated, the flow of data from the slow-speed memory 116 to the BIC 110 of port card 109 is temporarily terminated, i.e., selectively shut down, by using the logical destination of the data as present at the sending port card, i.e., port card 109. Note that this type of flow control limits access to the FIFO staging buffer 112, but not access to the transmit bus 104. This lack of bus access control is assumed because selective control for bus access based on logical addresses is too complex to implement at BIC 110. In addition, with such a control on bus access, a data stream that is flow-controlled can starve other data streams since data from the flow-controlled stream is wastefully occupying a FIFO staging buffer 112 of a sending port card.

The triggering of multipriority flow control is based upon the buffer occupancy of the high-speed FIFO buffer 114 of a receiving port card. An out-of-band flow control signal could, but need not, be employed to carry control messages containing high-speed FIFO buffer 114 occupancy information from receiving port cards to sending port cards. It is also possible to employ an in-band signal for this purpose.

Multipriority flow control is deactivated when a BIC 110 transmits a special control signal to itself, which can be in the form of a "dummy" envelope of data. Upon receipt of the dummy envelope, the BIC 110 automatically generates and transmits a control message just as if, for purposes of illustration, the "dummy" envelope were transmitted by some other port card. The control message contains a signal indicative of the fact that FIFO buffer 114 has recovered from congestion, and is no longer congested. In this context, congestion refers to the existence of an undesirably high buffer occupancy. The control message also contains the logical destination address corresponding to the now-uncongested BIC 110. Since no envelopes may be received by a port card that had previously activated flow control but has not yet deactivated such control, the dummy envelope operation is necessary in order to deactivate flow control.

For transmission of the dummy envelopes, a separate high-speed staging buffer may be provided in BIC 110, and this buffer may be referred to as a control buffer. Dummy envelopes have priority over ordinary data envelopes in access to the switch fabric 102. The above architectural choices simplify the flow control scheme and, hence, render it attractive to implement at BIC 110.

Figure 2:
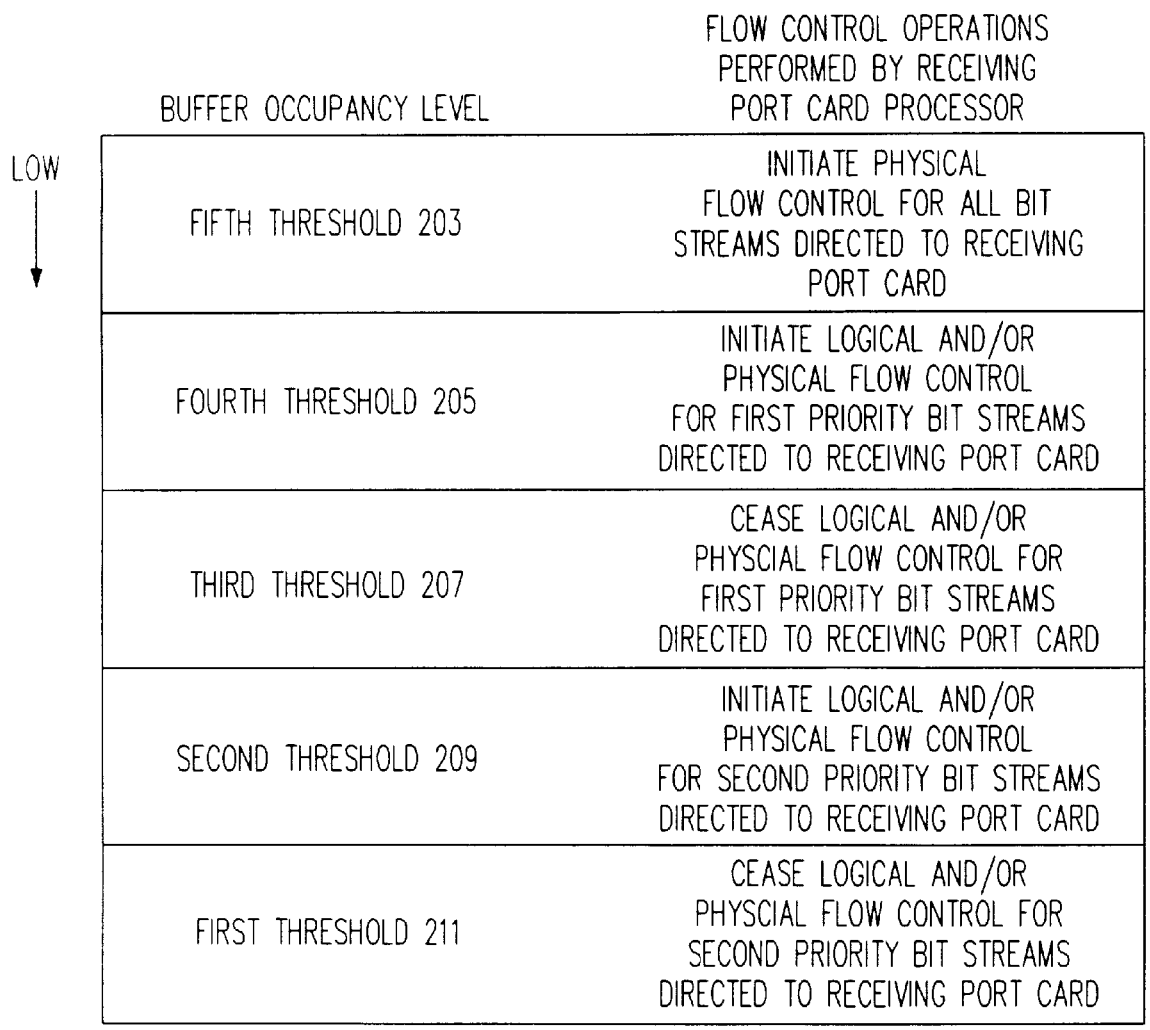
FIG. 2 is a block diagram setting forth an illustrative organizational hierarchy of buffer occupancy levels for the buffer of FIG. 1 as employed in the procedure of FIG. 5.

The multipriority data flow control techniques disclosed herein may, but need not, be employed in the context of a data switching mechanism with the characteristics described in the immediately preceding paragraphs. Referring now to FIG. 2, a first method of multipriority data flow control, termed logical flow control, operates as follows. The occupancy of a buffer on a port card is monitored. If the occupancy exceeds a second threshold 209 greater than a first threshold 211, the bit rates of the second-priority bit streams destined for a given port card are compared. Transmission of the second-priority bit stream having the highest bit transfer rate, or a group of second-priority bit streams having the highest bit transfer rates, is disabled until the buffer occupancy drops below the first threshold 211. Once the buffer occupancy drops below the first threshold 211, transmission of the second-priority bit rate stream (or streams) having the highest bit transfer rate (or rates) is enabled.

If the occupancy exceeds a fourth threshold 205 greater than a third threshold 207, the bit transfer rates of the first-priority data streams destined for a given port card are compared. Transmission of the first-priority bit stream having the highest bit transfer rate, or a group of first-priority bit streams having the highest bit transfer rates, is disabled until the buffer occupancy drops below the third threshold 207. Once the buffer occupancy drops below the third threshold 207, transmission of the first-priority bit rate stream or streams having the highest bit transfer rate (rates) is enabled. In this manner, high-packet-transfer-rate streams are controlled first, and, if lower-packet-transfer-rate streams are controlled at all, such streams are controlled after the higher-packet-transfer-rate streams have already been subjected to control. Therefore, the occurrence of higher-packet-transfer-rate streams will not prevent the receipt of lower-packet-transfer-rate streams.

According to a second method of multipriority data flow control, termed physical flow control, the occupancy of a buffer on a port card 108 (FIG. 1) is monitored. If the occupancy exceeds a second threshold 209 (FIG. 2) greater than a first threshold 211, transmission of all second-priority bit streams to the port card 108 is disabled until the buffer occupancy drops below the first threshold 211. Once the buffer occupancy drops below the first threshold 211, transmission of all second-priority bit streams to the port card is enabled. If the buffer occupancy exceeds a fourth threshold 205 greater than a third threshold 207, transmission of all first-priority bit streams to the port card is disabled until the buffer occupancy drops below the third threshold 207. Once the buffer occupancy drops below the third threshold 207, transmission of all first-priority bit streams to the port card is enabled.

A third method of multipriority data flow control, termed hybrid flow control, is a combination of the first and second flow control methods. First, logical flow control is performed. The buffer occupancy of the port card buffer is monitored and, once the occupancy exceeds a fifth threshold 203 greater than the fourth threshold 205, logical flow control ceases and physical flow control is performed, such that the transmission of all bit streams to the port card is disabled. Transmission of first-priority bit streams to the port card is enabled when the buffer occupancy drops below the third threshold 207, and transmission of second-priority bit streams to the port card is enabled when the buffer occupancy drops below the first threshold 211.

FIGS. 3A and 3B are illustrative data structure diagrams showing the organization of the slow-speed memory 116 of FIG. 1. Slow-speed memory 116 is partitioned into a sending queue 2006, shown in FIG. 3A, and a receiving queue 2008, shown in FIG. 3B. Referring to FIG. 3A, each sending queue 2006 is subpartitioned into a plurality of destination queues, such that each queue holds packets heading to a given logical destination address. For example, sending queue 2006 includes a first destination queue in the form of "queues of packets destined for logical address 'A'" 2010, and a second destination queue in the form of "queues of packets destined for logical address 'N'" 2012. Logical address 'A' may correspond, for example, to port card 108 (FIG. 1), and logical address 'N' may correspond, for example, to port card 113 (FIG. 1).

Each destination queue, in turn, is subdivided into a plurality of priority queues, wherein each priority queue includes data packets representing a given data priority. For example, "queues of packets destined for logical address 'A'" 2010 includes a priority one queue 2014, a priority two queue 2016, a priority three queue 2018, and a priority four queue 2020. Similarly, "queues of packets destined for logical address 'N'" 2012 includes a priority one queue 2022, a priority two queue 2024, a priority three queue 2026, and a priority four queue 2028.

Referring now to FIG. 3B, each receiving queue 2008 is subpartitioned into a plurality of destination queues, such that each destination queue corresponds to a given logical destination address. For example, receiving queue 2008 includes a first destination queue in the form of "queues of packets destined for logical address '1'" 2020, and a second destination queue in the form of "queues of packets destined for logical address 'M'" 2052. Each destination queue, in turn, is subdivided into a plurality of priority queues, wherein each priority queue includes data packets representing a given data priority. For example, "queues of packets destined for logical address '1'" 2020 includes a priority one queue 2030, a priority two queue 2032, a priority three queue 2034, and a priority four queue 2036. Similarly, "queues of packets destined for logical address 'M'" 2052 includes a priority one queue 2038, a priority two queue 2040, a priority three queue 2042, and a priority four queue 2044.

Figure 4A:
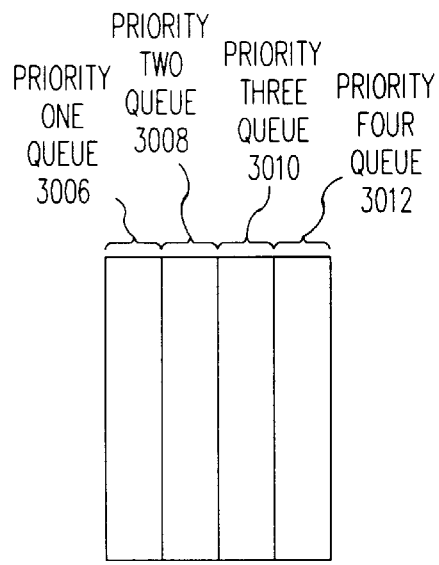
FIGS. 4A, 4B, and 4C are data structure diagrams setting forth illustrative organizational topologies for the high-speed FIFO buffer and the FIFO staging buffer of FIG. 1.

FIG. 4A is an illustrative data structure diagram showing the organization of FIFO staging buffer 112 (FIG. 1). Each FIFO staging buffer 112 is partitioned into one or more sending staging queues, such as sending staging queue 3002, and each sending staging queue 3002 is subpartitioned into a priority one queue 3006, a priority two queue 3008, a priority three queue 3010, and a priority four queue 3012.

Figure 4B:
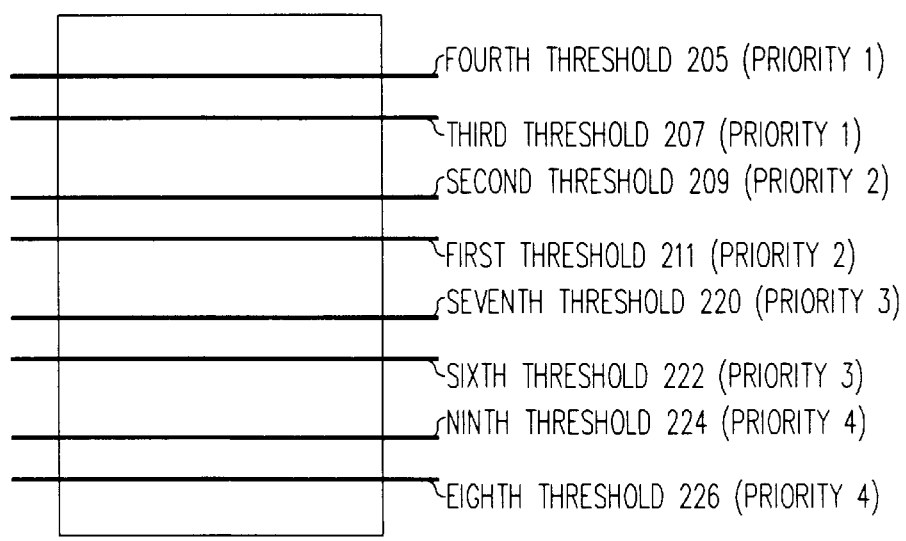

FIG. 4B is an illustrative data structure diagram showing the organization of high-speed FIFO buffer 114 (FIG. 1) for use in conjunction with physical or logical flow control methods, where four data priority levels have been defined. The high-speed FIFO buffer 114 is organized into a receiving staging queue 3004 partitioned using a fourth threshold 205 and a third threshold 207 for priority one data, a second threshold 209 and a first threshold 211 for priority two data, a seventh threshold 220 and a sixth threshold 222 for priority three data, and a ninth threshold 224 and an eighth threshold 226 for priority four data.

Figure 4C:
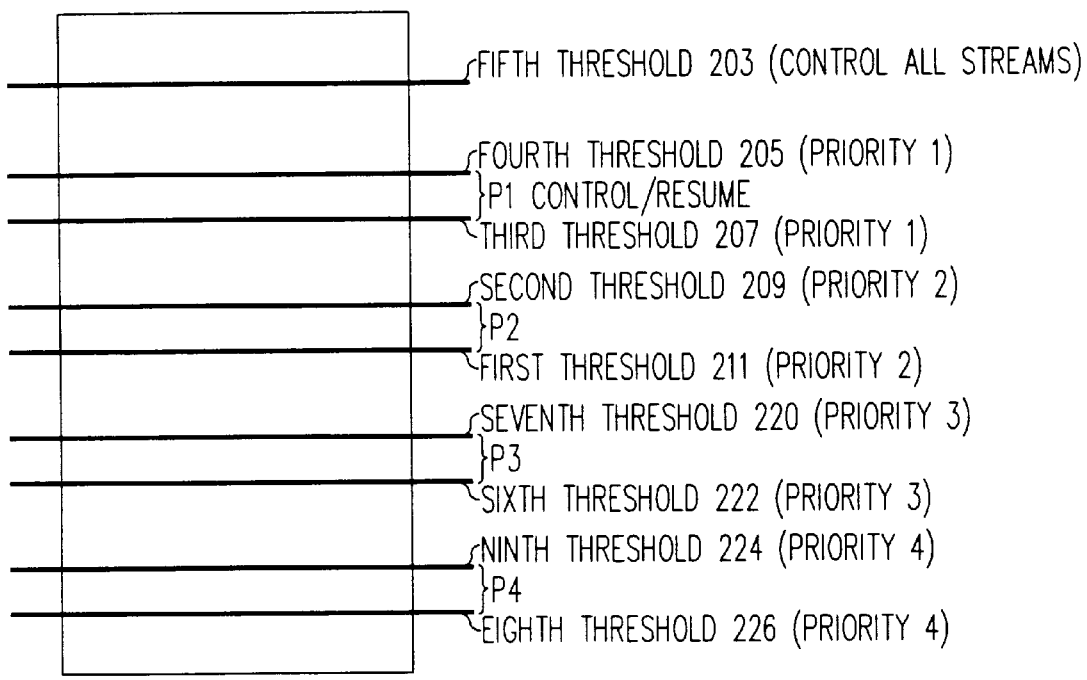

FIG. 4C is an illustrative data structure diagram showing the organization of high-speed FIFO buffer 114 for use in conjunction with hybrid flow control methods (for example, the method of FIGS. 5A–5F), and where four data priority levels have been defined. The high-speed buffer 114 is organized into a receiving staging queue 3004 partitioned using a fifth threshold 203 corresponding to the controlling of all data streams when physical control is to be applied. The receiving staging queue is also partitioned using a fourth threshold 205 and a third threshold 207 for priority one data, a second threshold 209 and a first threshold 211 for priority two data, a seventh threshold 220 and a sixth threshold 222 for priority three data, and a ninth threshold 224 and an eighth threshold 226 for priority four data.

Logical flow control may be conceptualized as having an underlying philosophy that seeks to control high-packettransfer-rate streams first and low-packet-transfer-rate streams later. As a general matter, logical flow control effectively isolates the stream (or streams) responsible for congestion, and only this stream (or these streams) are controlled. In principle, this is an ideal scheme since flow control is limited to the responsible streams, and streams that are not responsible for congestion are not controlled at all. However, the selection of a stream or a set of streams that will be subjected to flow control is, as a practical matter, somewhat difficult. Selection may be based upon, for example, buffer occupancies, or the arrival rates of the streams at the high-speed buffer 114 (FIG. 1). Since it is desired to keep high-speed buffer 114 relatively small, measurement of the buffer occupancy may not be a reliable stream selection criterion, particularly in an environment where a large number of streams have been multiplexed together. On the other hand, information on arrival rates is regarded as a better criterion for stream selection, but the burden of measuring these arrival rates is far beyond the capabilities of practical BICs 110 (FIG. 1).

One illustrative logical flow control approach is simple and effective. Streams are "implicitly" selected for control, based upon their packet transfer rates, wherein the packet transfer rate is used to infer a corresponding bit transfer rate, and the data stream (or streams) having the highest rate (or rates) is (are) shut down, so that such a stream (or such streams) no longer appear on the switch fabric 102 (FIG. 1). No actual measurement of the bit transfer rate is required. During periods of time when flow control is to be applied, streams are shut down in the order that the streams appear at the high-speed buffer 114 of the receiving port card. In this manner, higher-rate streams are more likely to be controlled than lower-rate streams, if the probability of a higher-rate stream occurring earlier in time is greater than that of a lower-rate stream, which is generally the case. If the high-speed buffer 114 of a receiving port card has an occupancy above a specified threshold, then data streams making their appearance at this buffer are controlled sequentially.

If the logical flow control scheme is used alone, without any other flow control techniques, one drawback is that data loss is not easily controlled. Data losses may result because streams are shut down sequentially and in a probabilistic manner. For tight control of data loss, some physical flow control of the data streams is necessary. However, in order to accomplish physical flow control, some mechanism must be provided whereby all port cards 108, 109, 113 that are coupled to the switch fabric 102 can be uniquely addressed. A further mechanism is required to map physical addresses to the logical addresses at a given port card 108. The addressing mechanism may be provided in the form of conventional physical addresses. These physical addresses, however, may also constitute a predetermined address space within the logical address space. In the former case, an additional bit could be used to distinguish between physical and logical addresses. Such an additional bit, along with the corresponding addresses, could be incorporated in a local switch header tagged to data packets. The data packet with its local switch header is referred to as an envelope. The translation from physical to logical addresses is provided at each BIC 110.

Pursuant to the physical flow control method disclosed herein, when a high-speed buffer 114 of a port card becomes congested (i.e., achieves an occupancy above a specified threshold), all of the logical streams destined to this high-speed buffer 114 are shut down by switching fabric 102 at the same time. Recall that, in the case of the logical flow control method, streams were implicitly selected based on their data transfer rates, only streams above a specified data transfer rate are shut down. In general, the physical scheme controls loss more effectively than the logical scheme. In the physical scheme, it is also possible in general to provide fair bandwidth sharing among streams. However, a higher-rate stream can "starve" a lower-rate stream (i.e., prevent the receipt of the lower-rate stream at high-speed buffer 114) in some cases. This is because the higher-rate stream essentially dictates the control frequency of the lower-rate stream. On the other hand, logical flow control consumes more bandwidth than physical flow control if the dummy-envelope transmission technique described above is used, since a dummy envelope must be generated for each logical address for which the flow of data is to be enabled.

In the hybrid control scheme, the respective strengths of logical flow control and physical flow control are combined. Logical flow control is activated with respect to second-priority data when the high-speed buffer 114 occupancy reaches the second threshold 209 (FIG. 2), and with respect to first-priority data when the high-speed buffer occupancy reaches the fourth threshold 205. Physical control is only activated when the logical control is ineffective in limiting the occupancy of high-speed buffer 114, and the occupancy reaches a fifth threshold 203 higher than the second and fourth thresholds 209, 205, respectively. Note that, in the implementation of hybrid flow control, flow control messages may be provided for specifying either a physical address or a logical address of a port card having a high-speed buffer 114 above a specified occupancy.

The software flowchart of FIGS. 5A–5F depicts the above method of multipriority data flow control, termed hybrid flow control, which is a combination of the logical and physical flow control methods. The sequence of operations set forth in FIGS. 5A–5F commences at block 301, where a plurality of bit streams, including one or more first-priority bit streams and one or more second-priority bit streams, arrive at high-speed FIFO buffer 114 (FIG. 1) of a receiving port card. Next, at block 303, processor 115 of the receiving port card checks to ascertain whether or not the occupancy of the high-speed FIFO buffer 114 is above second threshold 209. The affirmative branch from block 303 leads to block 305 of FIG. 5A, and the negative branch loops back to block 301.

At block 305, the processor checks to ascertain whether or not the occupancy of the high-speed FIFO buffer 114 is above fourth threshold 205. The affirmative branch from block 305 leads to block 307 of FIG. 5A, and the negative branch leads to block 309 of FIGS. 5B. At block 307, the processor checks to ascertain whether or not the occupancy of the high-speed FIFO buffer 114 is above fifth threshold 203. The affirmative branch from block 307 leads to block 327 of FIG. 5E, and the negative branch leads to block 316 FIG. 5C.

Figure 5A:
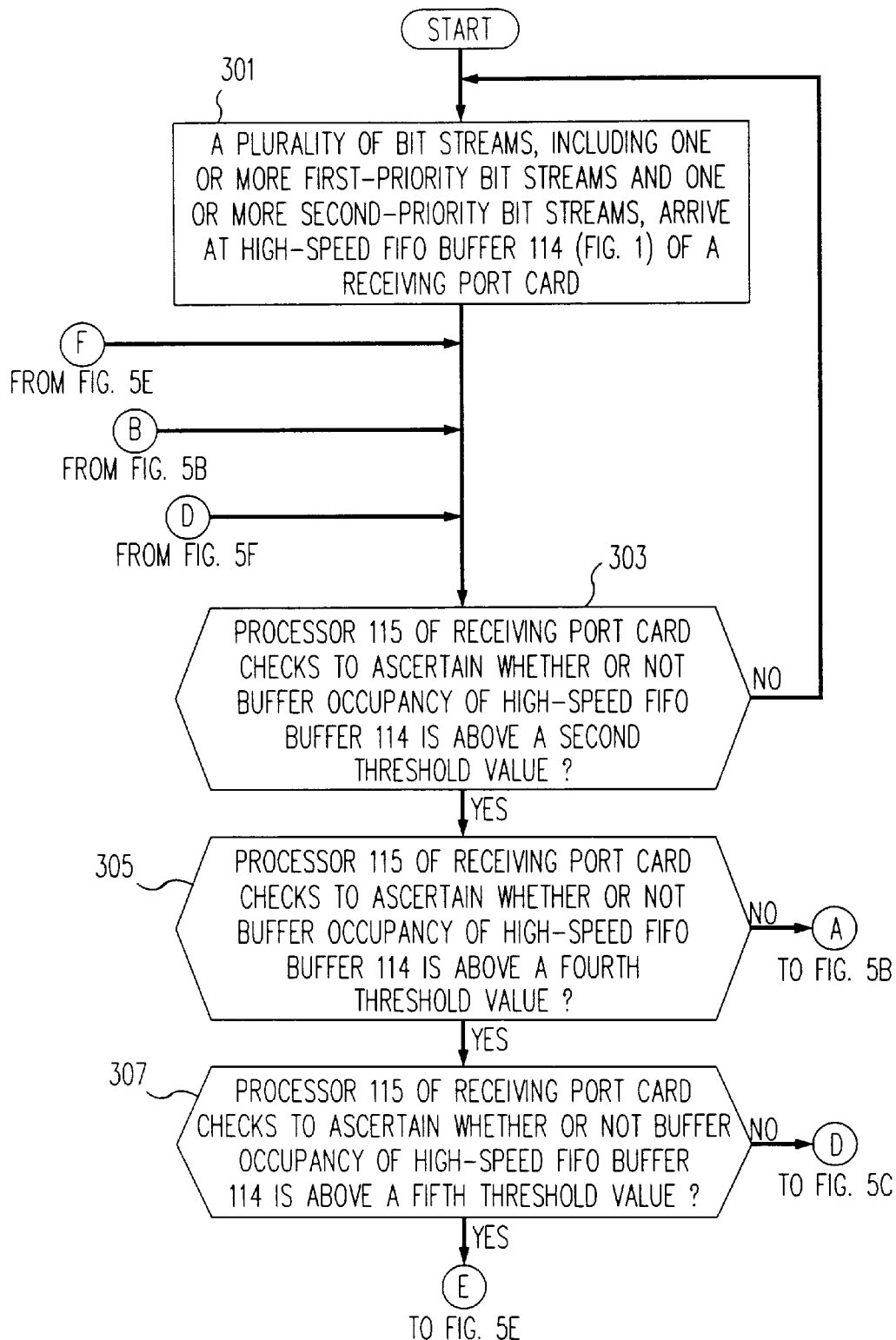
FIGS. 5A–5F together comprise a software flowchart setting forth an illustrative multipriority data flow control method.
Figure 5B:
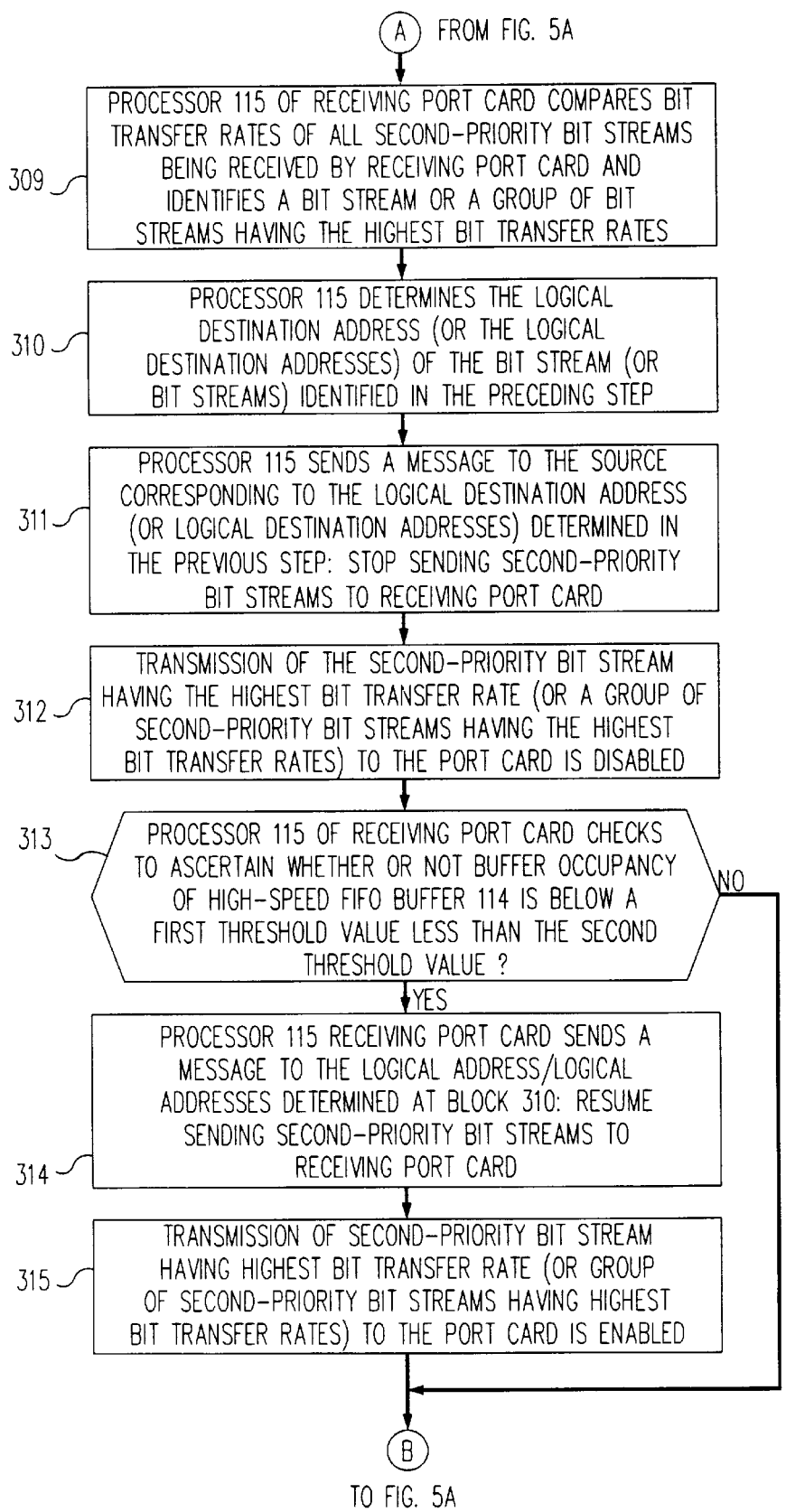
Figure 5C:
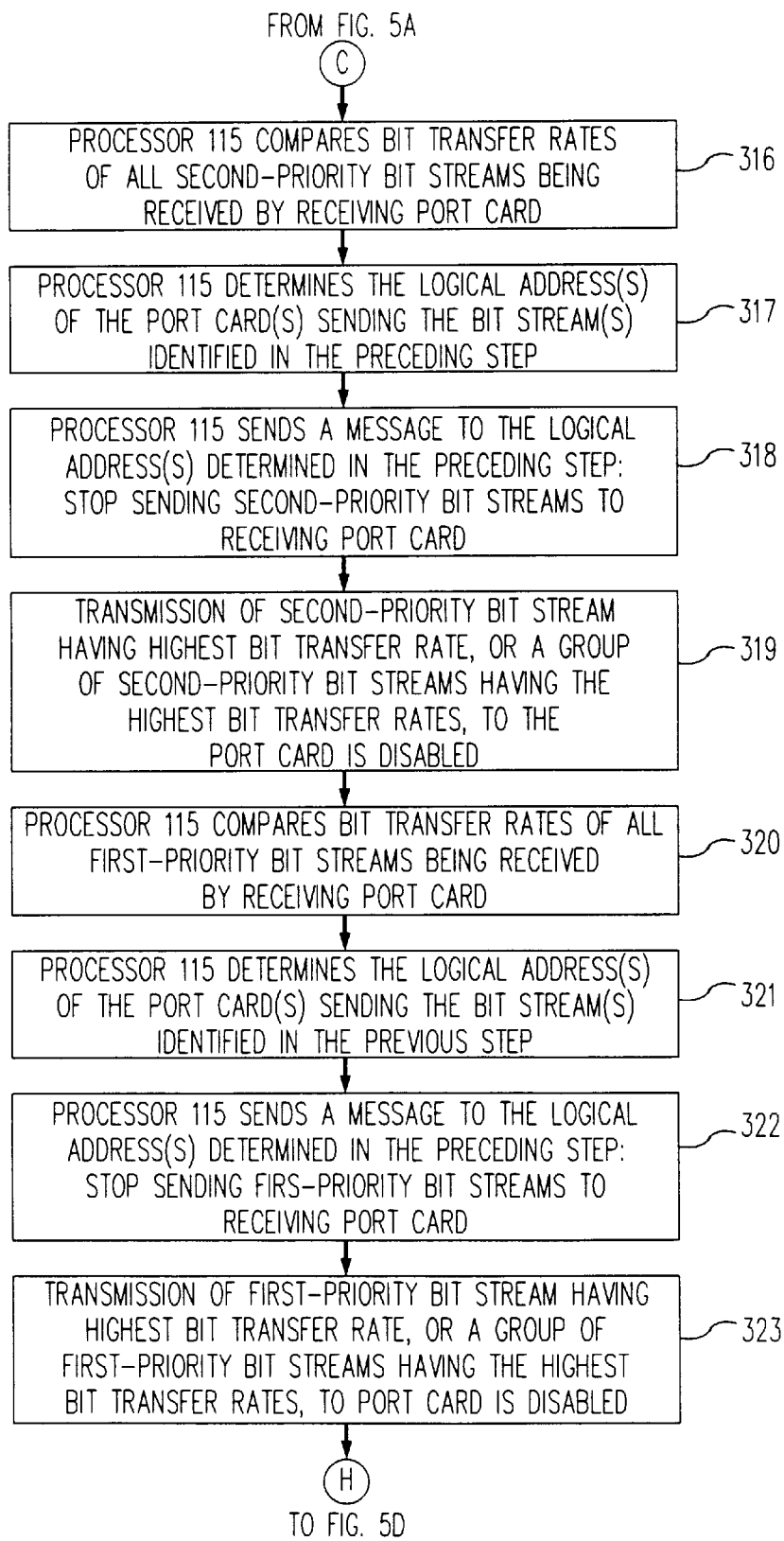
Figure 5D:
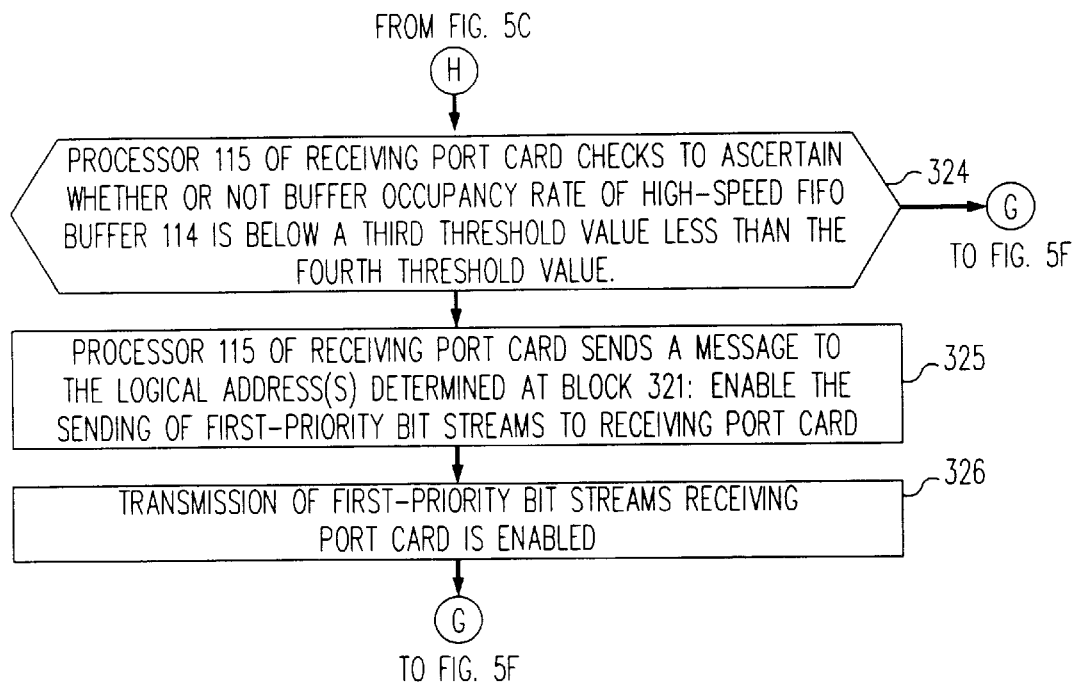

The operations of block 309 (FIG. 5B) are executed upon the occurrence of a negative branch from block 305 (FIG. 5A). At block 309, the processor 115 of the receiving port card compares the bit transfer rates of all second-priority bit streams being received by the receiving port card and identifies a bit stream (or a group of bit streams) having the highest bit transfer rate(s). At block 310, the processor 115 determines the logical destination address (or the logical destination addresses) of the port card (or port cards) sending the bit stream (or bit streams) identified in the preceding step. This bit stream (or these bit streams) may be identified, for example, by examining the number of received data packets corresponding to the stream or streams. The processor 115 of the receiving port card sends a message to the source corresponding to the logical destination address (or logical destination addresses) determined in the previous step, and this message specifies "stop sending second-priority bit streams to the receiving port card" (block 311). Transmission to the receiving port card of the second-priority bit stream having the highest bit transfer rate, or a group of second-priority bit streams having the highest bit transfer rates, is disabled (block 312). At block 313, the processor 115 checks to ascertain whether or not the occupancy of the high-speed FIFO buffer 114 is below first threshold 211 which is less than second threshold 209. The affirmative branch leads to block 314, and the negative branch leads to block 303 of FIG. 5A.

At block 314, the processor 115 of the receiving port card sends a message to the source corresponding to the logical destination addresses (or logical destination addresses) determined at block 310 instructing this source to resume sending second-priority data to the receiving port card (block 314). Transmission of the second-priority bit stream (or the second-priority bit streams) having the highest bit transfer rate (or bit transfer rates) to the receiving port card is now enabled at block 315. The program then loops back to block 303 (FIG. 5A).

The negative branch from block 307 (FIG. 5A) leads to block 316 (FIG. 5C) where processor 115 of the receiving port card compares the bit transfer rates of all second-priority bit streams being received by the receiving port card. At block 317, processor 115 of the receiving port determines the logical destination address (or logical destination addresses) of the port card (or port cards) sending the bit stream(or bit streams) identified in the previous step. The processor 115 of the receiving port card then sends a message to the source corresponding to the logical destination address (or logical destination addresses) determined in the preceding step: "stop sending second-priority bit streams to the receiving port card" (block 318). Transmission to the receiving port card of the second-priority bit stream having the highest bit transfer rate, or a group of second-priority bit streams having the highest bit transfer rates, is disabled (block 319). At block 320, processor 115 of the receiving port card compares the bit transfer rates of all first-priority bit streams being received by the receiving port card. At block 321, the processor 1 15 of the receiving port card determines the logical destination address (or the logical destination addresses) of the port card (or port cards) sending the bit stream (or bit streams) identified in the previous step. The processor 115 of the receiving port card then sends a message to the source corresponding to the logical destination address (or logical destination addresses) determined in the preceding step: "stop sending first-priority bit streams to the receiving port card" (block 322). Transmission to the receiving port card of the first-priority bit stream having the highest bit transfer rate, or a group of first-priority bit streams having the highest bit transfer rates, is disabled (block 323). The program then branches to block 324 of FIG. 5D.

At block 324, the processor 115 of the receiving port card checks to ascertain whether or not the occupancy of the high-speed FIFO buffer 114 is below third threshold 207 which is less than fourth threshold 205. The affirmative branch leads to block 325, and the negative branch leads to block 329 of FIG. 5F. At block 325, the processor 115 of the receiving port sends a message to the source corresponding to the logical destination address (or logical destination addresses) determined at block 321. This message enables the sending of the first-priority bit stream having the highest data transfer rate (or the sending of the first-priority bit streams having the highest data transfer rates) to the receiving port card (block 326). The program then branches to block 329 of FIG. 5F. At block 329 (FIG. 5F), the processor 115 of the receiving port checks to ascertain whether or not the occupancy of the high-speed FIFO buffer 114 is below first threshold 211 which is less than second threshold 209. The affirmative branch leads to block 331, and the negative branch loops back to block 303 of FIG. 5A. At block 331, the processor 115 of the receiving port card sends a message to the logical destination address (or logical destination addresses) determined at block 317. This message enables the sending of the second-priority bit stream having the highest data transfer rate (or the sending of the second-priority bit streams having the highest data transfer rates) to the receiving port card (block 333). The program then loops back to block 303 of FIG. 5A.

Figure 5E:
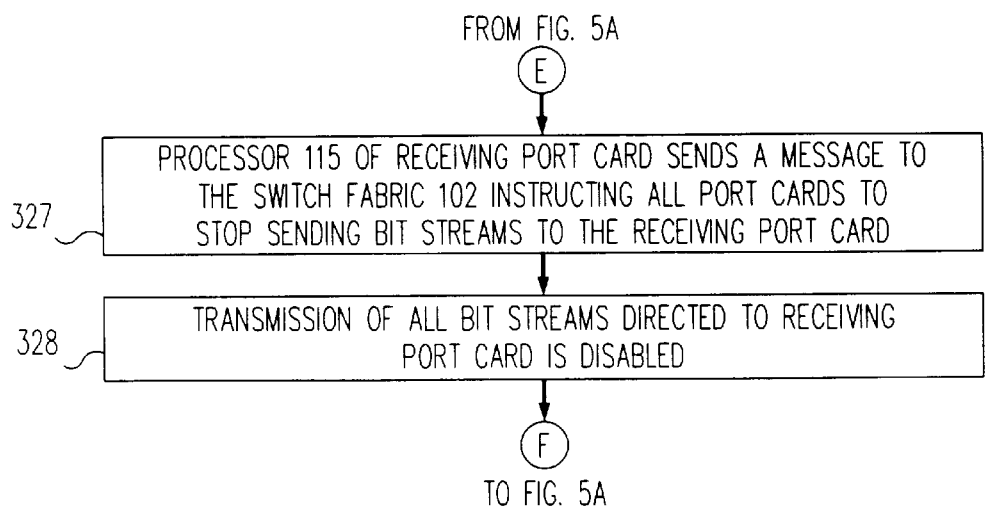
Figure 5F:
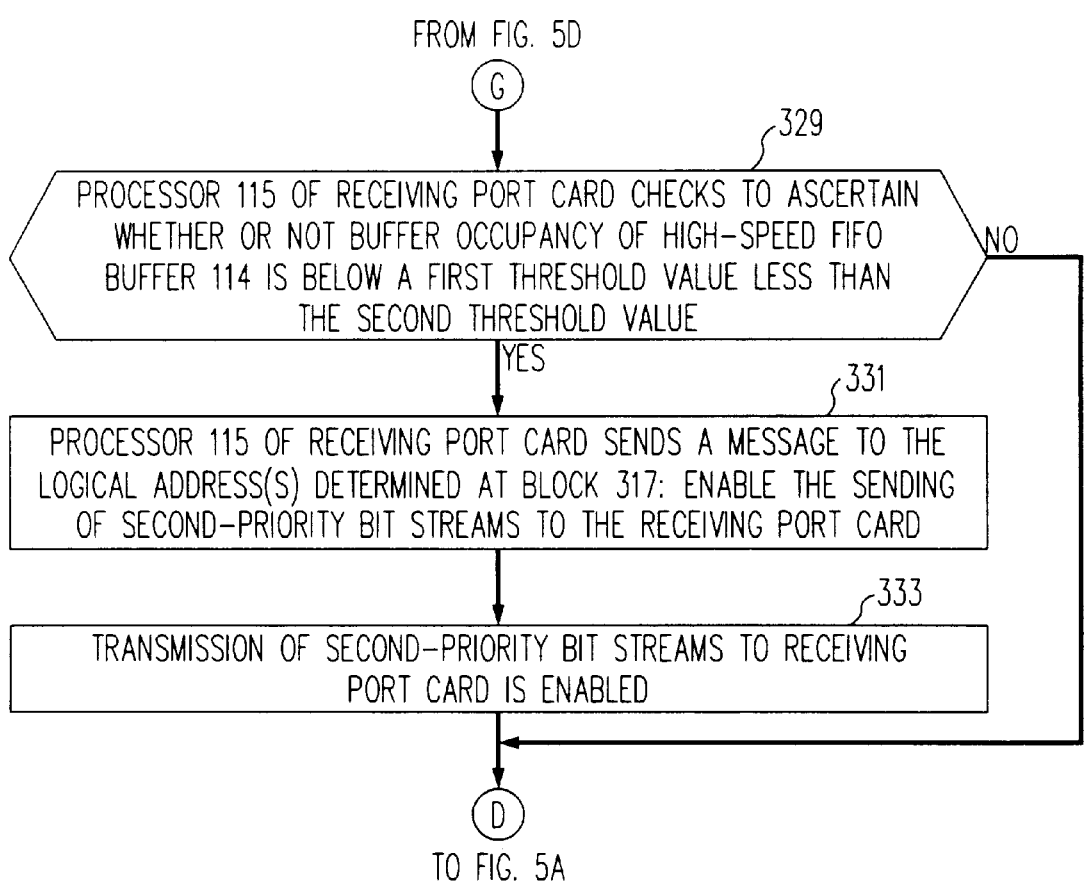

If an affirmative condition is found at block 307 (FIG. 5A), the program advances to block 327 of FIG. 5E, where the processor 115 of the receiving port card sends a message to the switch fabric 102 instructing all port cards to stop sending bit streams to the receiving port card. At block 328, transmission of all bit streams directed to the receiving port card is disabled. The program then loops back to block 303 (FIG. 5A).

The sequence of operations described in FIGS. 5A–5F implement a hybrid flow control method that combines logical flow control with physical flow control. In the context of multipriority data, high-priority data streams are not controlled (and, hence, not delayed), unless these streams are responsible for undesirably high buffer occupancy rates (i.e., congestion) at the receiving port card. Low-priority streams, on the other hand, are controlled, irrespective of their responsibility for causing high buffer occupancy rates, if any higher-priority stream is being controlled. In this manner, higher-priority streams are effectively isolated from congestion-causing, lower-priority streams. Moreover, the flow of high-priority streams is kept intact, at least to the extent that the receiving buffer has capacity available to receive this high-priority stream.

Effectively, the method of FIGS. 5A–5F shuts off lower-priority bit streams first and delays control of higher-priority bit streams until it is necessary to control these higher-priority streams. This method is based upon the multiple pairs of buffer occupancy thresholds, such as the first threshold 211-second threshold 209 pair, and the third threshold 207-fourth threshold 205 pair, shown in FIG. 2. The first threshold 211-second threshold 209 pair correspond to second-priority buffer thresholds, and the third threshold 207-fourth threshold 205 pair corresponds to first-priority buffer thresholds. Note that the fifth threshold 203 corresponds to a threshold defining when logical flow control, as opposed to physical flow control, will be implemented. These thresholds are defined with respect to the data streams that are conveyed over switch fabric 102. It is to be understood that the examples of FIGS. 2 and 5A–5F were described in the context of dual-priority data streams (i.e., first-priority streams and second-priority streams) for illustrative purposes only, and virtually any desired number of priority rankings may be employed. For example, a third priority may be defined with a sixth threshold-seventh threshold pair, wherein the sixth threshold is less than the seventh threshold, and the seventh threshold is less than the first threshold.

Assume that the hardware configuration of FIG. 1 is used to perform the flow control methods disclosed herein. First, consider a set of cases where all data streams have the same priority. A 4-Gbps switch is employed for switch fabric 102.

A total of 20 port cards are used, only three of which are actually shown in FIG. 1, as port cards 108, 109, and 113. A data transfer rate from the slow-speed memory 116 to the BIC 110 at each port card 108, 109, 113. to be defined as the fetch rate (FR), is specified as 200 Mbps for purposes of the present example. The data transfer rate from the BIC 110 to the slow-speed memory 116, defined as the drain rate (DR), is also set to 200 Mbps. Assume that each port card 108, 109, 113 has 20 logical destination addresses, and each of these destinations could receive data from any of the other port cards 108, 109, 113 coupled to the switching fabric 102. For simplicity, the size of the slow-speed memory 116 at each port card 108, 109, 113 is assumed to be infinite.

Since one concern in the present analysis is the queueing performance at high-speed buffer 114 (i.e., on the receive side), the traffic pattern at the FIFO staging buffer 112, (i.e.,at the transmit side) is of less concern and hence, unless otherwise specified, the aggregate incoming traffic is assumed uniformly distributed among all the sending port cards 108, 109, 113. The function of the FIFO staging buffer 112 is to serve as a staging area for envelopes to be transmitted on the switch fabric 102. The capacity of the FIFO staging buffer 112 should be large enough to sustain data flow and thereby maximize switch fabric 102 throughput for a given bus arbitration mechanism.

Figure 6A:
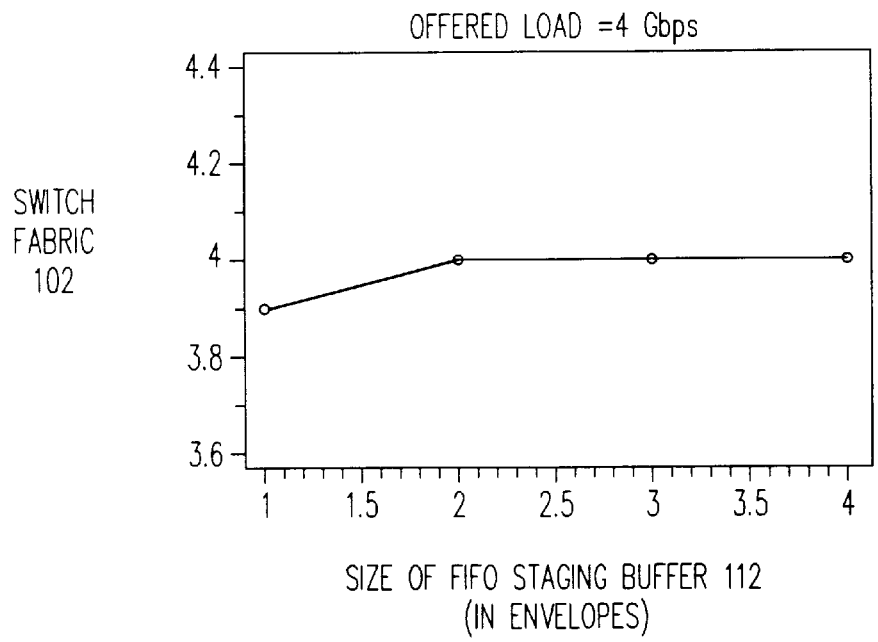
FIGS. 6A–6D set forth various system operational parameters for the hardware configuration of FIG. 1 when no flow control techniques are applied.

FIGS. 6A–6D (prior art) set forth various system operational parameters for the hardware configuration of FIG. 1 when no flow control is applied, i.e., when the system of FIG. 1 is used to perform prior-art data switching. Therefore, FIGS. 6A–6D serve as a performance baseline to which the methods disclosed herein will be compared. FIG. 6A shows bus throughput as a function of the size of the FIFO staging buffer 112, in units of data envelopes, when the offered load is equal to the speed of switch fabric 102. With a staging buffer 112 capacity greater than or equal to 2 envelopes, the data traffic flow is sustained and, hence, full utilization of switch fabric 102 bandwidth is achieved. On the other hand, it is obvious that, as the capacity of the FIFO staging buffer 112 increases, the receiving high-speed FIFO buffer 114 must be equipped to handle an increased number of data envelopes while flow control is enabled. This is because flow control operates between the slow-speed memory 116 and the FIFO staging buffer 112. Therefore, the size of the FIFO staging buffer 112, i.e., the sending buffer, will be assumed to be 2 (in units of envelopes) for purposes of the present analysis.

The total capacity of the high-speed buffer 114 and the FIFO staging buffer 112, and the capacity of the high-speed buffer 114 taken alone, are denoted, respectively, by B and RB, wherein RB=(B−2), in units of data envelopes.

The traffic pattern to the high-speed FIFO buffer 114 has the greatest impact on BIC 110 data queueing. The greater the traffic focus into a given high-speed FIFO buffer 114, the more serious the data congestion is. Note that the traffic pattern at receiving port cards is essentially determined by two types of correlation: a temporal correlation, and a spatial correlation. The former implies that a single port card is sending envelopes to a particular logical destination for a long period of time, the duration of which is referred to as length of destination correlation, and hence stressing the receiving port card to which the destination belongs. The latter, spatial correlation, implies that a number of port cards are simultaneously transmitting data envelopes to the same logical destination.

Figure 6B:
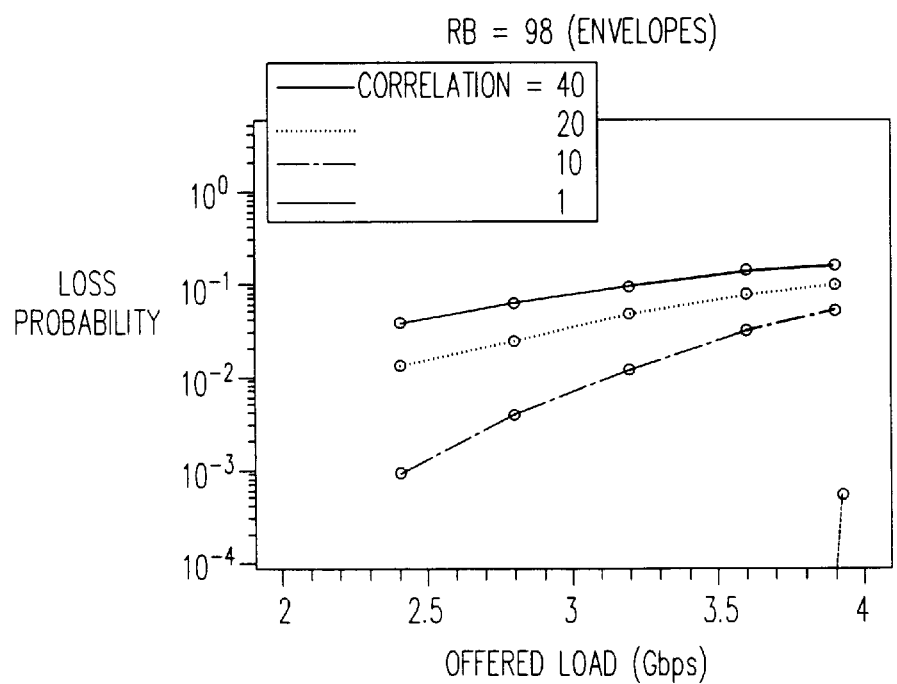
Figure 6C:
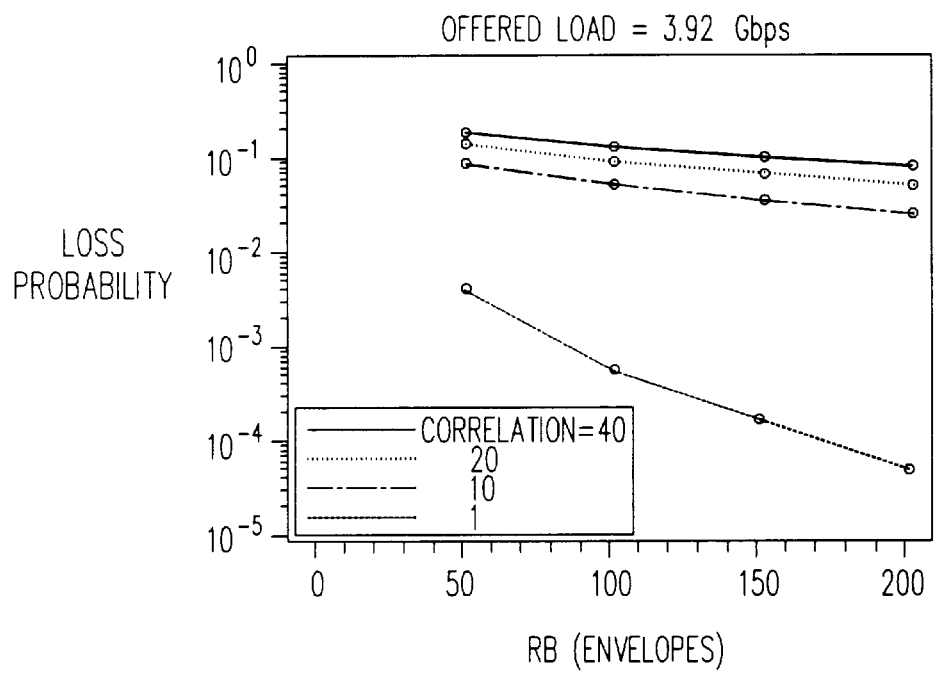

FIGS. 6B and 6C set forth the data loss performance of prior art data switching systems. In a first scenario, with the results shown in FIG. 6B, loss is examined as a function of offered load and length of destination correlation, assuming that RB=98 (in units of envelopes). As expected, data loss increases substantially as offered load increases. The offered load of 2.4 to 3.92 Gbps implies that the utilization of each receiving port card is from 0.6 to 0.98 respectively since the total load is equally distributed among the 20 receiving port cards with DR=200 Mbps. For a given load, loss performance deteriorates greatly as more envelopes are consecutively routed to the same destination by increasing the mean length of destination correlation from 1 to 40 (envelopes).

In a second scenario, depicted in FIG. 6C, the effect of the size of the high-speed FIFO buffer 114 on reducing data loss is examined. In this and subsequent scenarios, the offered load is assumed to be fixed at 3.92 Gbps. FIG. 6C reveals that, by increasing the size of the high-speed FIFO buffer 114, data loss is reduced to a certain extent. However, the improvement is limited, especially in the presence of strong destination correlation at the sending port cards. Considering the cost of the high-speed memory used to implement high-speed FIFO buffer 114, it is obvious that increasing the receive buffer capacity is not a panacea for the prevention of data loss.

Figure 6D:
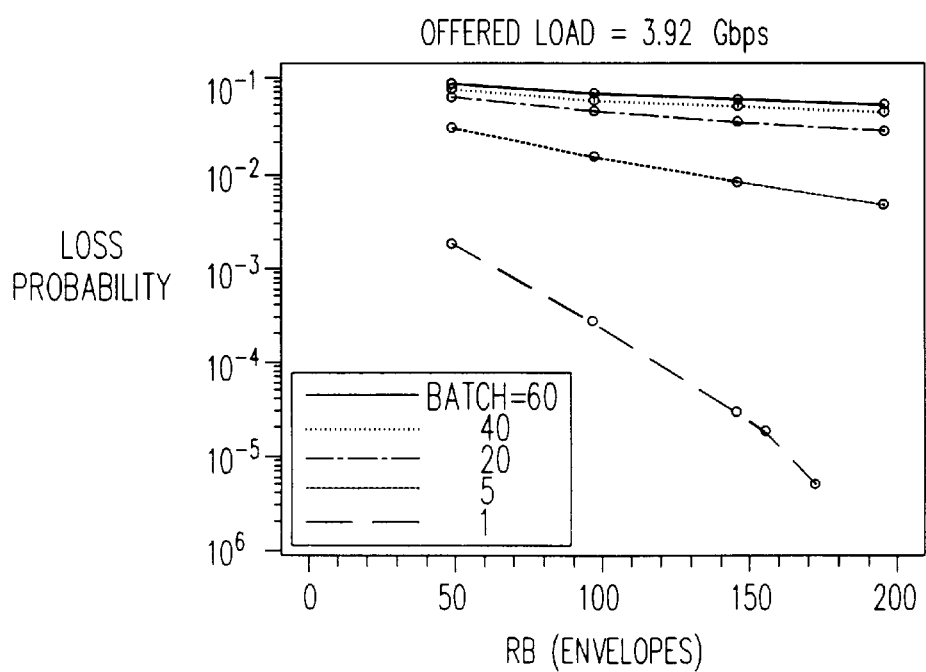

In the scenario of FIG. 6D, the arrival of data at a port card, in the form of batches of data, is examined, with a focus on the impact of batch size on loss. A prior-art example of batch arrivals occurs in practice with TCP/IP-based applications riding over an ATM (asynchronous transfer mode) transport line. In a service known to those skilled in the art as the "Classical IP over ATM" service and defined by the IETF (Internet Engineering Task Force), the maximum size of an IP packet is 9.18 Kbytes, which implies that the switch fabric 102 can experience a batch arrival of more than 190 envelopes. For purposes of the present example, assume batches of envelopes (generated by the occurrence of a large IP packet) arriving at each sending port card and heading to the same destination port card. However, note that distinct batches, in practice, will have independently- and uniformly-distributed destinations. Also assume that the size of a batch is governed by a uniform distribution.

FIG. 6D shows the loss probability as a function of mean batch size with different receive-buffer capacities. As one would expect, loss performance is improved as the batch size decreases, or as the capacity of the high-speed FIFO buffer 114 (FIG. 1) is increased. However, the improvement gained by using an increased buffer size is seriously limited, as was the case with the previous scenario described in conjunction with FIG. 6C. Although flow control may be used to reduce loss by shifting data queueing from the receive side of the BIC 110 to the large slow-speed RAM 116 of the sending port card, it is important not to sacrifice other performance metrics while exercising flow control.

Figure 7:
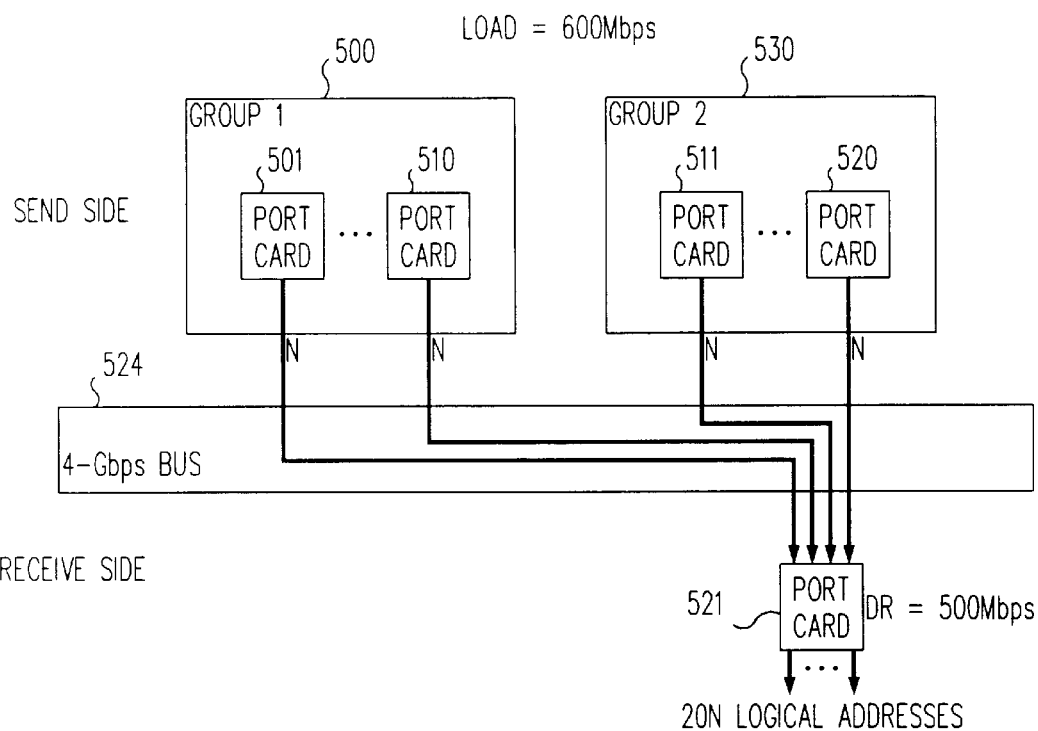
FIG. 7 is a hardware block diagram showing a first operational environment where many incoming data streams are directed to a single port card.

To compare the performance of the flow control techniques disclosed herein with prior art techniques, consider the example of FIG. 7. A first group of port cards, group 1 500, includes 10 port cards, of which port card 501 and port card 510 are shown. A second group of port cards, group 2 530, includes 10 port cards, of which port card 511 and port card 520 are shown. A receiving port card 521 is also provided. All port cards 501, 510, 511, 520, 521 are coupled to a 4-Gbps bus 524. It is assumed that the group 1 500 and group 2 530 port cards are sending port cards, and that these port cards are all sending data to the receiving port card 521. In this manner, receiving port card 521 may be referred to as a "hot spot". The example of FIG. 7, therefore, illustrates a "hot-spot scenario" in a 4-Gbps, 21-port-card data switch with FR=DR=500 Mbps. The total offered load is set to 600

Mbps, and the fraction of total load generated by group 1 500 and group 2 530 is varied as a parameter.

Assume that each sending port card sources N independent data streams, and that the data streams have disjoint logical destinations. Within each group (group 1 500 and group 2 530), the load is uniformly-distributed among the logical data streams. The size of the high-speed FIFO buffer 114 is chosen to be aggressively small at B=45 (envelopes). As an example, define buffer occupancy thresholds such that, for the logical flow control technique, used alone, the first and third thresholds 211, 207 (FIG. 2) are equal to 5 envelopes, and the second and fourth thresholds 209, 205 are equal to 10 envelopes. For the physical flow control technique, used alone, the first and third thresholds 211, 207 are equal to 5 envelopes, and the second and fourth thresholds 209, 205 are equal to 10 envelopes. For the hybrid flow control method, the first and third thresholds 211, 207 are equal to one envelope, the second and fourth thresholds 209, 205 are equal to six envelopes, and the fifth threshold 203 is equal to 16 envelopes.

Figure 8A:
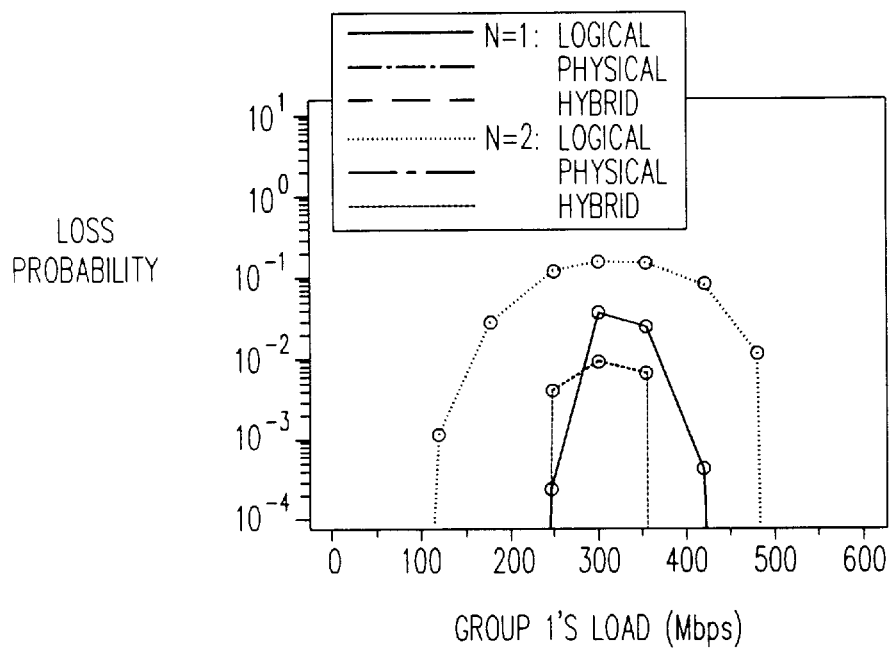
FIGS. 8A–8D are graphs summarizing the performance of physical flow control techniques, logical flow control techniques, and hybrid flow control techniques, in the configuration of FIG. 7.

FIGS. 8A–8D summarize the performance of three control techniques, physical flow control used alone, logical flow control used alone, and the hybrid flow control method disclosed herein, in the hot-spot scenario of FIG. 7. In the preparation of FIGS. 8A–8D, the load on group 1 500 was varied from 0 to 600 Mbps and, accordingly, the load on group 2 530 was varied from 600 to 0 Mbps. In FIG. 8A, observe that the logical scheme alone cannot easily control data loss since control is activated incrementally on a per-received-logical-address basis. FIG. 8A also shows that data loss increases as the number of logical streams multiplexed increases from 20 (N=1) to 40 (N=2). Another observation is that loss tends to decrease as the group 1 500 port cards and the group 2 port cards 530 become incomparable in their data transfer rates. This is true because, in the present case, a group of data streams has a dominant rate and, hence, flow control is likely to act only upon this group.

On the other hand, with the physical flow control scheme, no loss occurs for any mix of group 1 500 and group 2 530 loads. In the physical scheme, the total number of "transit" envelopes that need be accommodated by the hot-spot buffer of port card 521 during flow control ON periods is the sum total of envelopes (a) being transmitted on the bus, and (b) those waiting for transmission in the staging FIFO buffers 112 of the sending port cards.

Compared with the logical flow control case, the physical flow control case shows a much smaller occupancy overshoot over the corresponding buffer occupancy threshold, thus resulting in no FIFO buffer 114 overflow. Also, in the physical case, the minimum occupancy appears to be equal to (the first threshold−1) because all the streams are enabled almost immediately after the occupancy falls down to the first threshold by sending (on the transmit side of bus 524) a common control message indicating a recovery from congestion at that physical destination. In contrast, in the logical case, since the sources receive the uncongested message individually, it takes additional time for all the sources to be enabled and, hence, the occupancy goes much further below the first threshold. With a large number of streams, therefore, the FIFO buffer 114 occupancy, in the logical case, occasionally drops to zero so that the drain bandwidth cannot be fully-utilized.

Figure 8B:
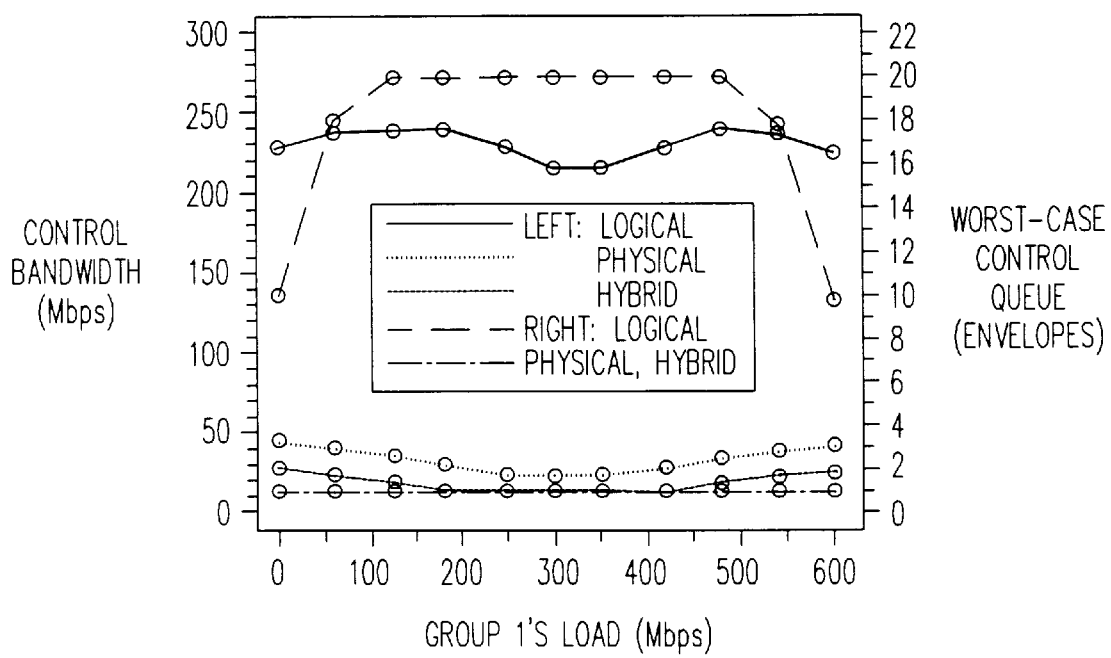

In FIG. 8B, the utilization of bus bandwidth and the control-buffer space requirements are compared for the transmission of dummy envelopes in the context of different flow control schemes. The results of FIGS. 8B, 8C, and 8D were obtained using 20 data streams. The transmission of dummy envelopes, in this scenario, with the physical scheme, used 25 to 46 Mbps of bus bandwidth on average and required only one envelope's worth of buffering, whereas the logical scheme utilized 216 to 240 Mbps of bus bandwidth and required up to a 20-envelope buffer. It is obvious that the logical scheme utilizes much more switch fabric resources than the physical scheme, since the logical scheme generates as many dummy envelopes as the number of flow-controlled streams.

Figure 8C:
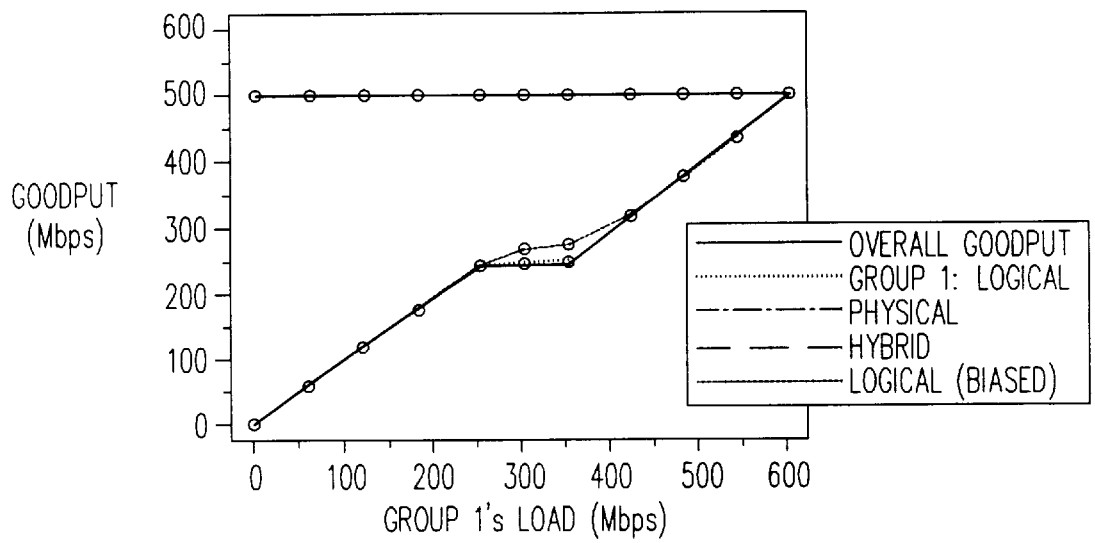

The goodput (good data throughput) performance of groups 1 and 2 is given in FIG. 8C. First, under both logical and physical schemes, the overall goodput is nearly equal to the drain rate of the hot-spot port card 521 (FIG. 7) for any fraction of the total load, which implies that no bandwidth is wasted. Second, both physical and logical schemes achieve MAX-MIN fairness in bandwidth allocation among streams. Further, streams within a group get an equal share of the MAX-MIN share allocated to the group. An important note is that in the logical scheme, unless streams are enabled in a random order, unfair bandwidth allocation among streams can happen. An example of unfair bandwidth allocation, i.e., a bias in bandwidth allocation, is shown in FIG. 8C. In this example, streams were intentionally enabled in consecutive order from port card 501 (FIG. 7) to port card 520, each time the occupancy at the high-speed FIFO buffer 114 fell down to the first threshold. It turns out that the streams within group 1 500 receive more allocation than mandated by the MAX-MIN fair allocation, thereby starving the streams within group 2 530.

Figure 8D:
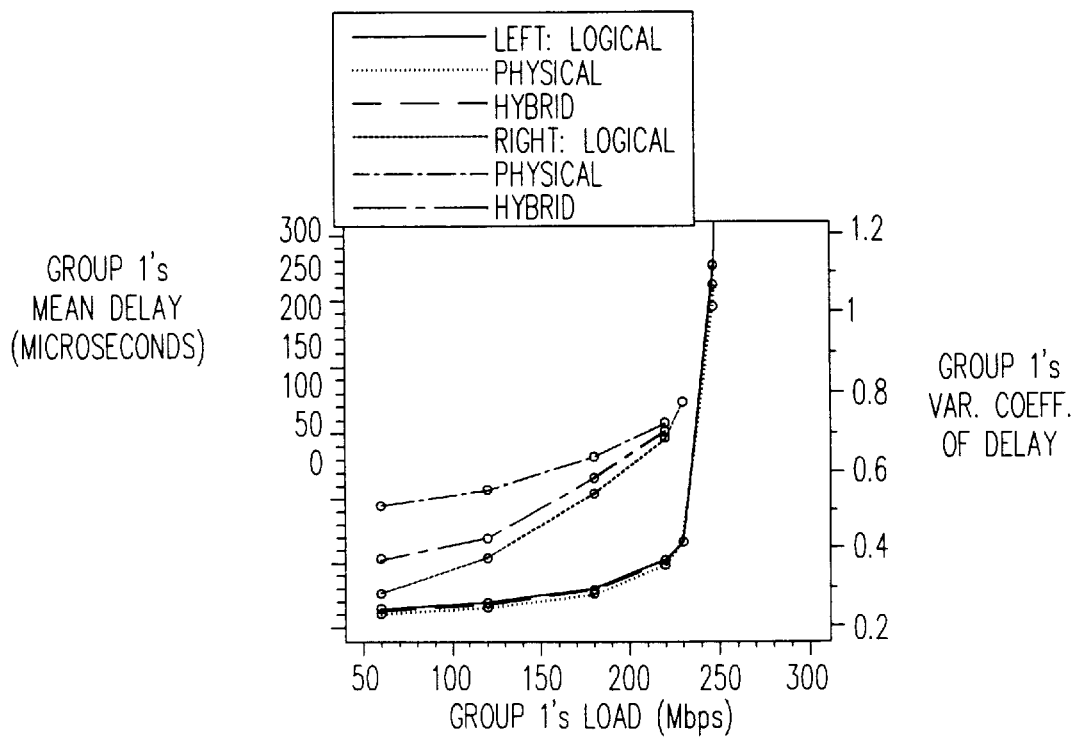

Finally, in FIG. 8D, the switching delay incurred by the control schemes is compared. The switching delay is defined to be the time spent by an envelope from arrival at the slow-speed memory 116 of the sending port cards to departure from the high-speed FIFO buffer 114 of the receiving port cards. Since group 1 500 cannot get more than 250 Mbps in bandwidth, the switching delay exponentially increases as group 1's load approaches 250 Mbps. The mean switching delay of a stream receiving its requested rate is in the order of a few tens of microseconds, with negligible difference between control schemes. The logical flow control scheme leads to a relatively larger variation in the switching delay than the physical flow control scheme. However, the difference is negligible since the absolute value of delay is fairly low.

Figure 9:
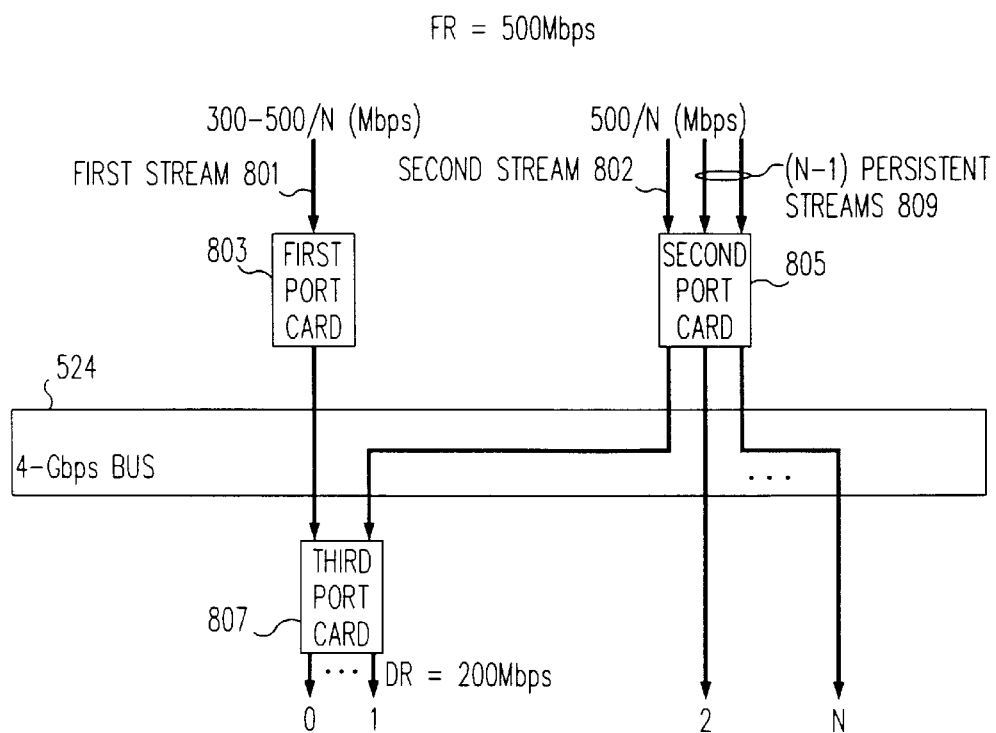
FIG. 9 is a hardware block diagram showing a second operational environment where two incoming data streams are directed to a single port card and one of these streams is subject to a fetch-rate constraint.

Next, consider a data flow scenario as depicted in FIG. 9, which reveals an intrinsic advantage of logical flow control in maintaining the throughput of low-rate streams. In this scenario, two logical streams, a first stream 801 having a high rate, and a second logical stream 802 having a lower rate than the first stream 801 are shown. The first stream 801 is sent from a first port card 803, having a destination address of 0, and the second stream 802 is sent from a second port card 805 with a destination address of 1. However, note that, in addition to the second stream 802, the second port card 805 is required to send out an additional (N-1) persistent streams 809. The first and second port streams 801, 802 share a 200-Mbps drain-rate with a third port card 807 that, in the present example, is a receiving port card. A 500-Mbps fetch-rate is employed at the second port card 805, shared by the second stream 802 and the other (N−1) persistent streams 809 via a well-known round-robin discipline. Since the (N−1) streams are assumed persistent, there are always envelopes destined for addresses 2-N at the slow-speed memory 116 of the sending port card 805, so that the second stream 802 periodically gets fetch opportunities at a average rate of 500/N Mbps. The rate of the first stream 801 is set to (300–500/N) Mbps, and the rate of the second stream 802 is set to 500/N Mbps.

Figure 10:
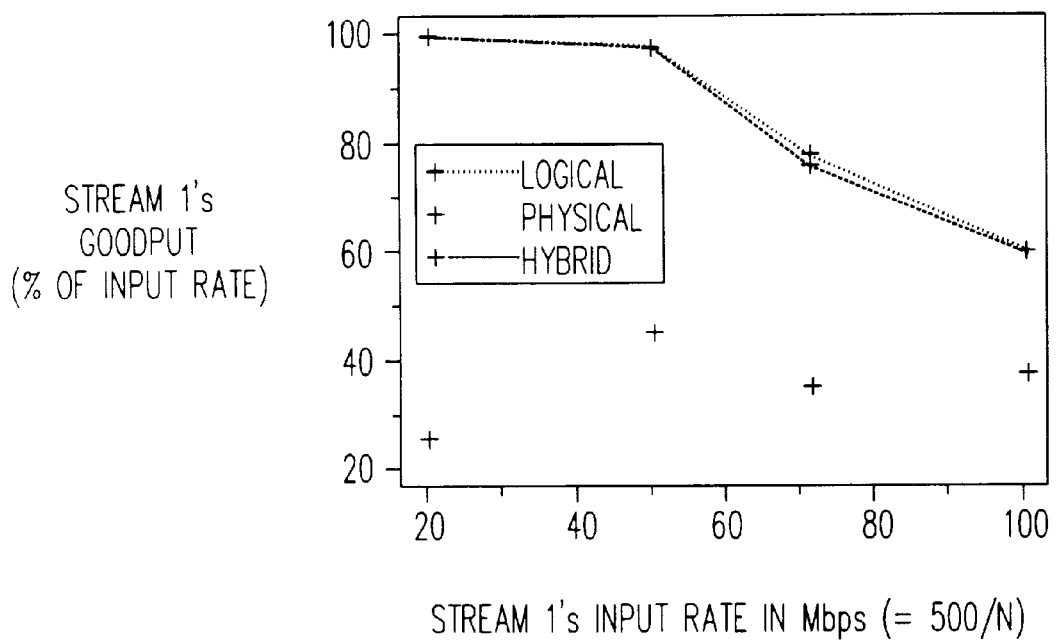
FIG. 10 is a graph illustrating the performance of the flow control techniques disclosed herein in the context of the system of FIG. 9.

FIG. 10 shows the goodput (good data throughput) performance of the second data stream 802 of FIG. 9, with different flow control schemes, when the second stream's input data rate is varied from 20 to 100 Mbps. Ideally speaking, for any input rate in this range, the second data stream 802 should attain the injected rate, since the stream is allowed to be fetched at the input rate, and an equal share of bandwidth at the point of maximum data congestion is 100 Mbps, which is greater than or equal to the input rate. However, it is found that the first data stream 801 greatly starves the second data stream 802, resulting in a minimum goodput of the second data stream 802 of 25% to 45% of the input rate. This is because the second stream 802 traffic can be moved from the slow-speed memory 116 to the staging FIFO buffer 112 of the sending port card 805 (FIG. 9) only if flow control is turned OFF, thereby possibly resulting in the loss of periodically-occurring fetch opportunities.

If all of the (N−1) persistent streams were to be removed from FIG. 9, the second stream 802 would attain the entire fetch bandwidth when (a) flow control is in an OFF state, and (b) the fetch opportunities are enough to catch up to the input bit stream arrival rate. Any ON/OFF type of flow control can potentially starve streams with a fetch-rate constraint since the streams require a higher rate than their input rate for fetch during control OFF periods. Such starvation should be limited to the streams responsible for the congestion.

One problem with physical flow control is that the low-rate stream is overwhelmed by the high-rate stream in sharing bandwidth, although it is less responsible for the congestion. The logical control scheme has an intrinsic advantage in such a scenario since the high-rate stream is more likely controlled than the low-rate stream. As shown in FIG. 10, with the logical scheme, the constrained low-rate stream obtains more bandwidth as the low-rate to high-rate stream bandwidth ratio decreases, and achieves almost 100% of its input rate with a ratio of 0.2 (i.e., 50-Mbps second stream 802 and 250-Mbps first stream 801, FIG. 9) or less.

When examining the performance of the hybrid flow control techniques disclosed herein in the hot-spot scenarios of FIGS. 7 and 9, it is apparent that these hybrid methods combine the desirable properties of both the physical and logical flow control schemes. For example, with the physical scheme, the occupancy at the hot-spot buffer of port card 521 (FIG. 7) has a very small down-swing below the first threshold 21 1(FIG. 2) since the streams are enabled rapidly in the physical sense. This observation leads to defining one set of illustrative thresholds for hybrid flow control such that, for a single-priority scheme, the first and third thresholds 211, 207 (FIG. 2) are set to 1, the second and fourth threshold 209, 205 are set to 6, and the fifth threshold 203 is set to 16 envelopes. If the fifth threshold 203 is lowered to the fourth threshold, the hybrid scheme reduces to the physical control scheme, whereas if the fifth threshold is increased to the maximum capacity of the high-speed FIFO buffer 114, the hybrid scheme is equivalent to logical flow control.

The aforementioned specific values of thresholds are provided for illustrative purposes only, It is to be understood that, in determining specific values for the thresholds of FIG. 2, one can always trade off between the advantageous properties of the physical and logical flow control methods. In the hot-spot scenario of FIG. 7, note that the hybrid scheme, with use of the parameters mentioned in the previous paragraph, led to much better loss performance than the logical scheme (see FIG. 8A), because of both extra physical-control capability and lowered logical thresholds (FIG. 2). On the other hand, when the number of data streams is increased from 20 to 40, the hybrid scheme may perform worse than the physical scheme in preventing loss. In practice, however, one can always adjust the fifth threshold 203 to prevent data loss for a given set of real-world conditions.

In terms of switch fabric 102 (FIG. 1) utilization, in a bus environment, the hybrid scheme uses the least bus bandwidth, as well as the least amount of buffer capacity (see FIG. 8B), since the sources are resumed physically, and the control activation/deactivation is less frequent than with the physical scheme. The hybrid scheme also achieves MAX-MIN fairness in bandwidth allocation among streams when there is enough fetch-rate available at the send side (see FIG. 8C) and low switching delay (see FIG. 8D). In addition to the above desirable properties, the hybrid scheme maintains the throughput of a lower-rate stream as effectively as with the logical scheme (see FIG. 10) when there are fetch-rate constraints.

Figure 11A:
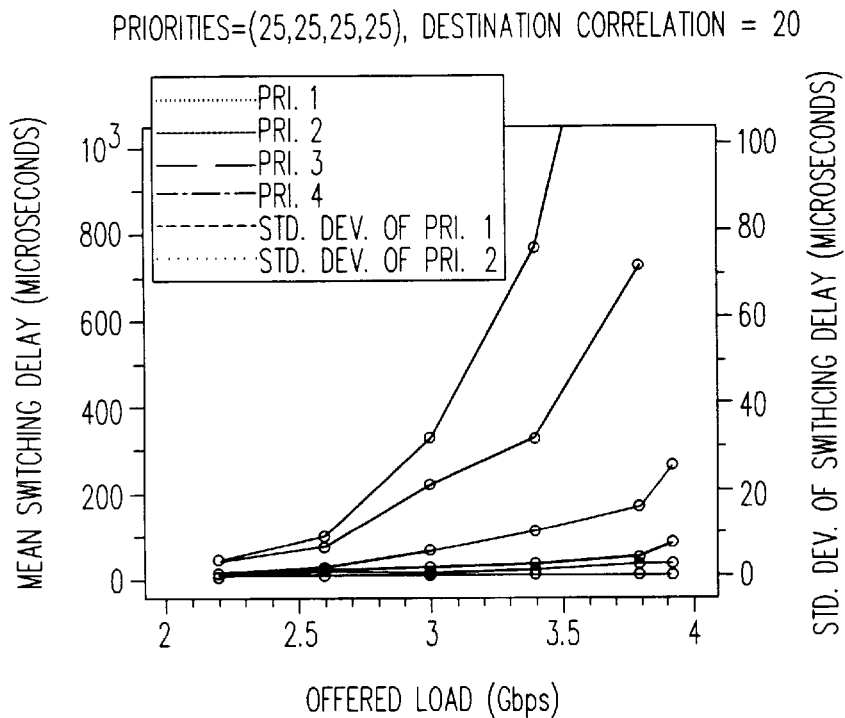
FIGS. 11A and 11B are graphs summarizing the performance of the flow control techniques described herein, as applied in an operational environment of multipriority data flow control.
Figure 11B:
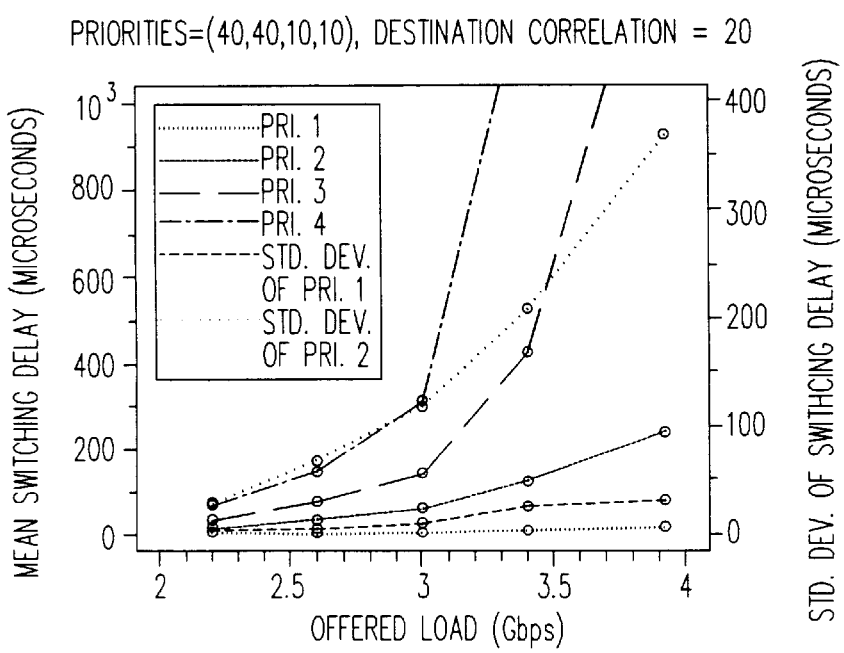

FIGS. 11A and 11B are graphs summarizing the performance of the hybrid flow control technique described herein, as applied in an operational environment of multipriority data and the hardware configuration used in the preparation of FIGS. 4A–4D. More specifically, FIGS. 11A and 11B illustrate the performance of these flow control techniques in the context of the four-priority system previously described in conjunction with FIGS. 4B and 4C. The capacity of the high-speed buffer 114 (FIG. 2) is set to 147 (envelopes). As an example, define buffer occupancy thresholds such that the first threshold is set to 55, the second threshold to 60, the third threshold to 95, the fourth threshold to 100, the fifth threshold to 115, the sixth threshold to 15, the seventh threshold to 20, the eight threshold to 5, and the ninth threshold to 10. The size of the FIFO staging buffer 112 is assumed to be 2 per each priority class. The graphs show mean switching delay in microseconds as a function of offered load in Gbps. The mean length of destination correlation was set to 20 envelopes.

Upon consideration of FIG. 11A where the load of the four priority classes is an equal fraction of the total load, it is apparent that priority-one and priority-two data streams are well-protected for offered loads that are close to the system capacity, with the maximum mean delay being about 100 microseconds as the system capacity limit is approached. The delay performance of the priority-one and priority-two data streams degrades slightly as the fraction of these data streams to the total offered load increases, and this result is shown in FIG. 11B. In the example of FIG. 11B, priority-one streams are still well-protected, but priority-two stream delays increase to about 200 microseconds as the system capacity limit is approached. However, note that 200 microseconds represents, from a practical standpoint, a relatively minor delay.

Such switching-delay priorities are especially useful in the context of ATM service catagories. By mapping CBR and real-time VBR (variable bit rate) classes into the priority-one and priority-two classes, one can convey delay-sensitive traffic with a minimum amount of delay and jitter.

We claim:

1. A method for use in a system having a memory capable of storing data, said data including first-class type of data and second-class type of data, and having a plurality of data sources that transmit said first-class type of data and second-class type of data, the method comprising the steps of receiving data transmitted from said plurality of data sources, and at a particular time when the amount of data stored in said memory is greater than a first threshold value, precluding the transmission of further of said first-class type of data from an individual one of said data sources in response to the receipt of said first-class type of data exclusively from that one of said data sources, while not precluding further transmission from any other of said data sources of said first-class type of data until said first-class type of data from such any other of said data sources is received, while also not precluding further transmission of said second-class type of data from any of said data sources as long as the amount of data stored in said memory is less than a second threshold value, said second threshold value being greater than said first threshold value.

2. The invention of claim 1 comprising the further step of storing in said memory data received from any of said data sources notwithstanding the performance of said precluding step.

3. The invention of claim 2 wherein said data includes third-class type of data and wherein said method comprises the further step of at a time when the amount of data stored in said memory is greater than said second threshold value, precluding the transmission of further of said second-class type of data from an individual one of said data sources in response to the receipt of data exclusively from that one of said data sources while not precluding further transmission from any other of said data sources of said second-class type of data until said second-class type of data from such any other of said data sources is received, while also not precluding further transmission of said third-class type of data from any of said data sources as long as the amount of data stored in said memory is less than a third threshold value, said third threshold value being greater than said second threshold value.

4. A method for use in a receiving means to which is transmitted data from a plurality of data sources including first data sources and second data sources, the method comprising the steps of storing in a memory data received from said plurality of data sources, and at a particular time when the amount of data stored in said memory is greater than a first threshold value, precluding the transmission of further data from an individual one of said first data sources in response to the receipt of data exclusively from that one of said first data sources, while not precluding further transmission from any other of said first data sources until data from such any other of said first data sources is received, while also not precluding further data transmission from any of said second data sources as long as the amount of data stored in said memory is less than a second threshold value, said second threshold value being greater than said first threshold value.

5. The invention of claim 4 wherein said plurality of data sources includes third data sources and wherein said method comprises the further step of at a time when the amount of data stored in said memory is greater than said second threshold value, precluding the transmission of further data from an individual one of said second data sources in response to the receipt of data exclusively from that one of said second data sources while not precluding further transmission from any other of said second data sources until data from such any other of said second data sources is received, while also not precluding further data transmission from any of said third data sources as long as the amount of data stored in said memory is less than a third threshold value, said third threshold value being greater than said second threshold value.

6. The invention of claim 5 wherein in said storing step, data received from any of said data sources is stored notwithstanding the performance of either of said precluding steps.

7. The invention of claim 4 wherein in said storing step, data received from any of said data sources is stored notwithstanding the performance of said precluding step.

8. A method for use in a receiving means to which is transmitted data from a plurality of data sources including first data sources and second data sources, the method comprising the steps of storing in a memory data received from said plurality of data sources, at a time when the amount of data stored in said memory is greater than a first threshold value, precluding the transmission of further data from an individual one of said first data sources in response to the receipt of data exclusively from that one of said first data sources, while not precluding further transmission from any other of said first data sources until data from such any other of said first data sources is received, while also not precluding further data transmission from any of said second data sources as long as the amount of data stored in said memory is less than a second threshold value, said second threshold value being greater than said first threshold value, and at a time when the amount of data stored in said memory is greater than said second threshold value, precluding the transmission of further data from an individual one of said second data sources in response to the receipt of data exclusively from that one of said second data sources while not precluding further transmission from any other of said second data sources until data from such any other of said second data sources is received.

9. The invention of claim 8 wherein said plurality of data sources includes third data sources and wherein in the second of said precluding steps, the transmission of further data from any of said third data sources is not precluded as long as the amount of data stored in said memory is less than a third threshold value, the third threshold value being greater than said second threshold value.

10. The invention of claim 9 wherein in said storing step, data received from any of said data sources is stored notwithstanding the performance of either of said precluding steps.

11. The invention of claim 8 wherein in said storing step, data received from any of said data sources is stored notwithstanding the performance of either of said precluding steps.

* * * * *